United States Patent

[11] 3,610,303

[72] Inventors Malcolm W. Loveland
Orinda;
Robert G. Ellis, Richmond, both of Calif.
[21] Appl. No. 870,909
[22] Filed Sept. 26, 1969
[23] Division of Ser. No. 629,600, Apr. 10, 1967
[45] Patented Oct. 5, 1971
[73] Assignee Atlas Pacific Engineering Company

[54] MACHINE FOR AUTOMATICALLY PEELING AND CORING APPLES FED FROM A BULK SUPPLY
12 Claims, 31 Drawing Figs.
[52] U.S. Cl. ..................................... 146/52, 198/33
[51] Int. Cl. ..................................... A23n 3/12
[50] Field of Search ..................................... 198/33 R; 146/52, 43, 33-39, 224

[56] References Cited
UNITED STATES PATENTS
2,299,761 10/1942 McCauley ..................... 146/43
2,738,819 3/1956 DeBack et al. ................ 146/51 X
3,016,076 1/1962 Keesling ....................... 146/52
3,163,282 12/1964 Shropshire et al. ............ 146/51 X
3,389,730 6/1968 Anderson et al. ............. 146/52

Primary Examiner—Willie G. Abercrombie
Attorney—Eckhoff and Hoppe

ABSTRACT: Apples are picked from a bulk supply and are fed continuously in single file order one at a time to the first of two orientors, the primary orientor. In the primary orientor, each apple is positioned with one of the two indents down and with its outer surface generally centered. The upper indent may or may not be in vertical alignment with the lower indent. The semioriented apples are then engaged by mechanism which engages both indents of the apple to refine the vertical alignment of the indents. Thereafter each properly oriented apple is moved into a peeling and coring mechanism wherein the skin and the core are removed and the indents are trimmed. Apples which are not fully oriented during the pickup are rejected before entering the peeling and coring sections. The peeling operation is particularly characterized in that each apple is peeled by one or more rotary cutters so that the peeling is effected very quickly.

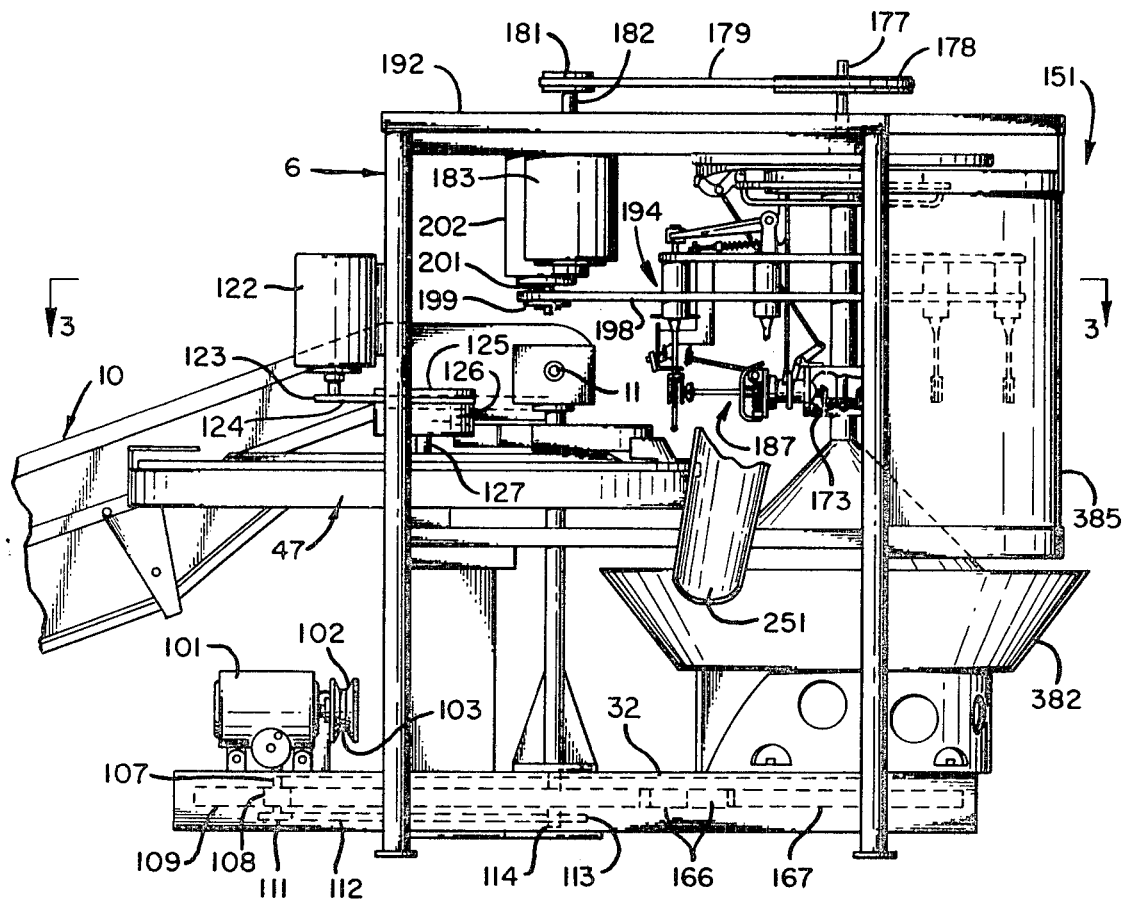
FIG_1_
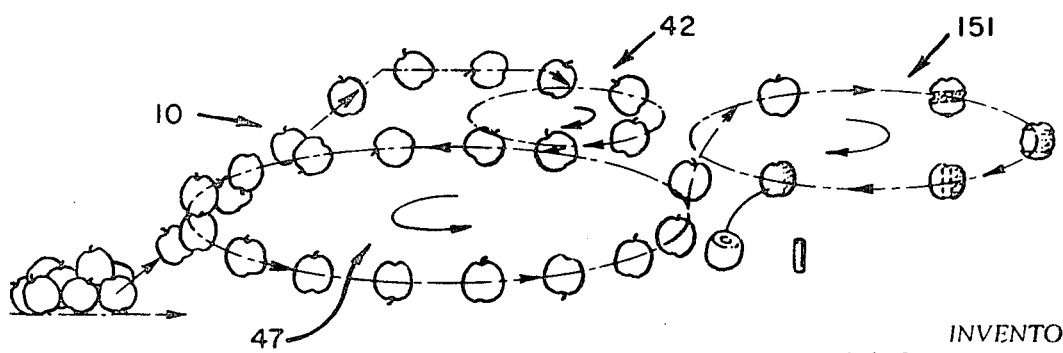
FIG_2_
INVENTORS
MALCOLM W. LOVELAND
ROBERT G. ELLIS
BY Eckhoff and Hogge
ATTORNEYS

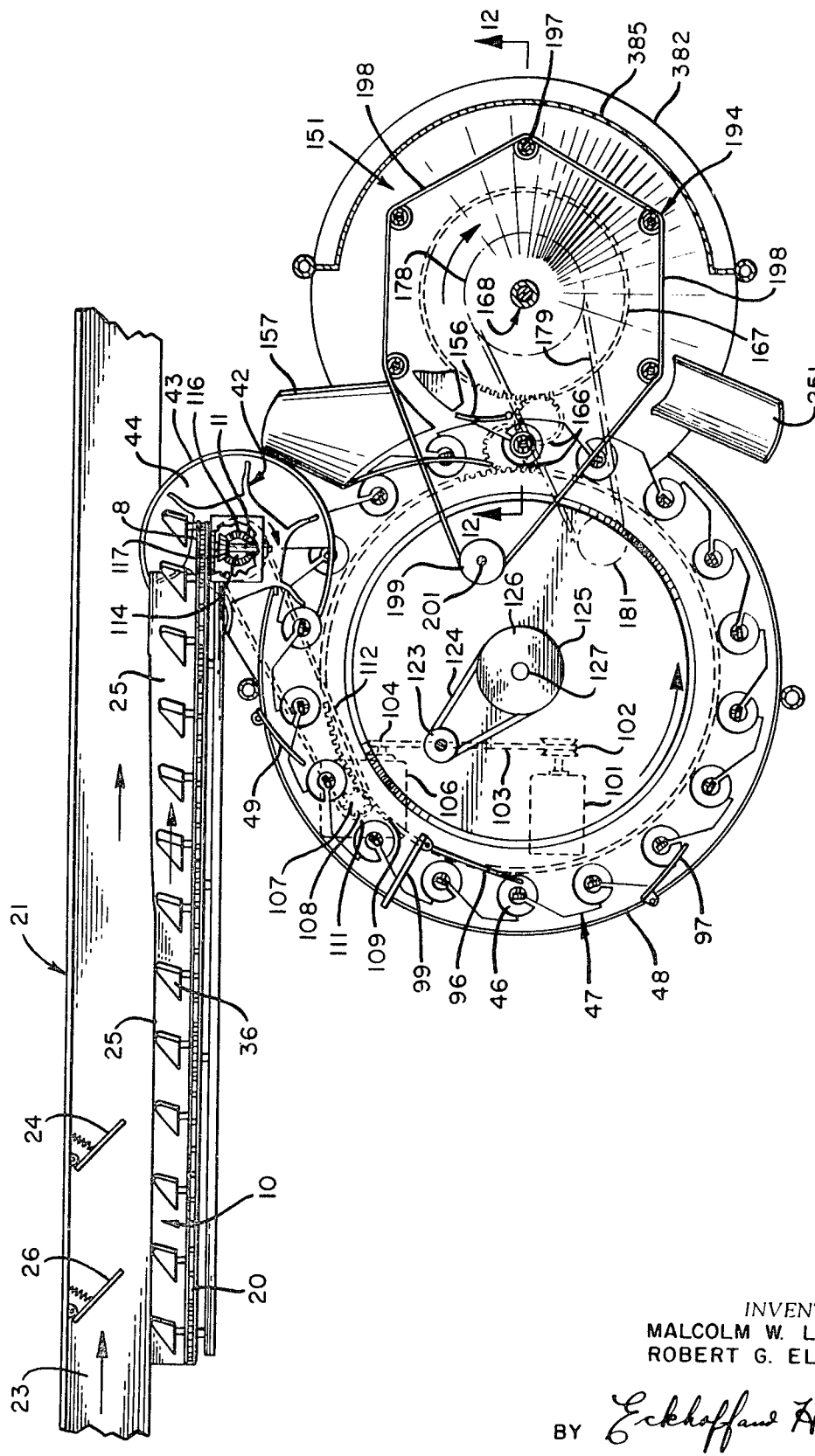

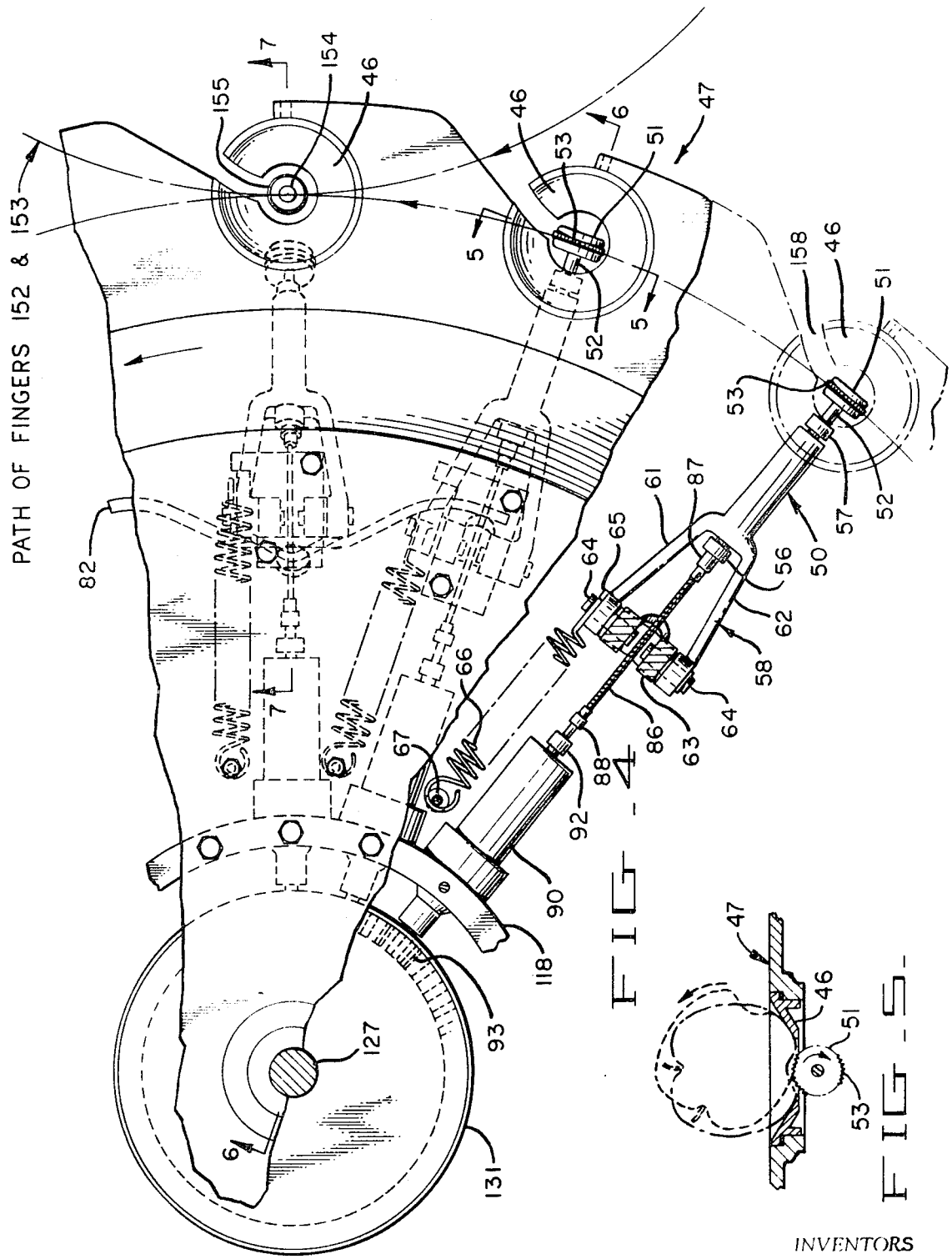

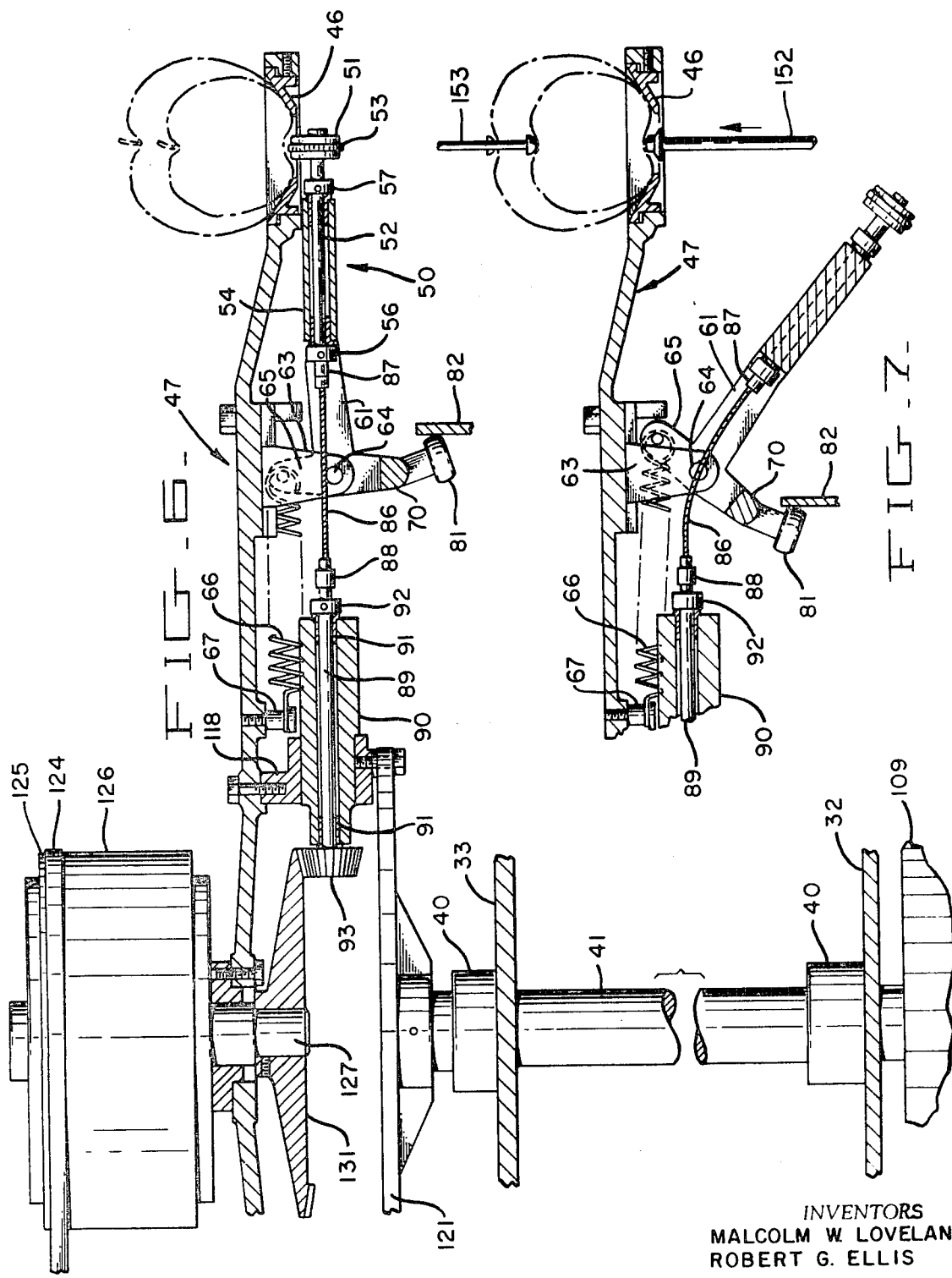

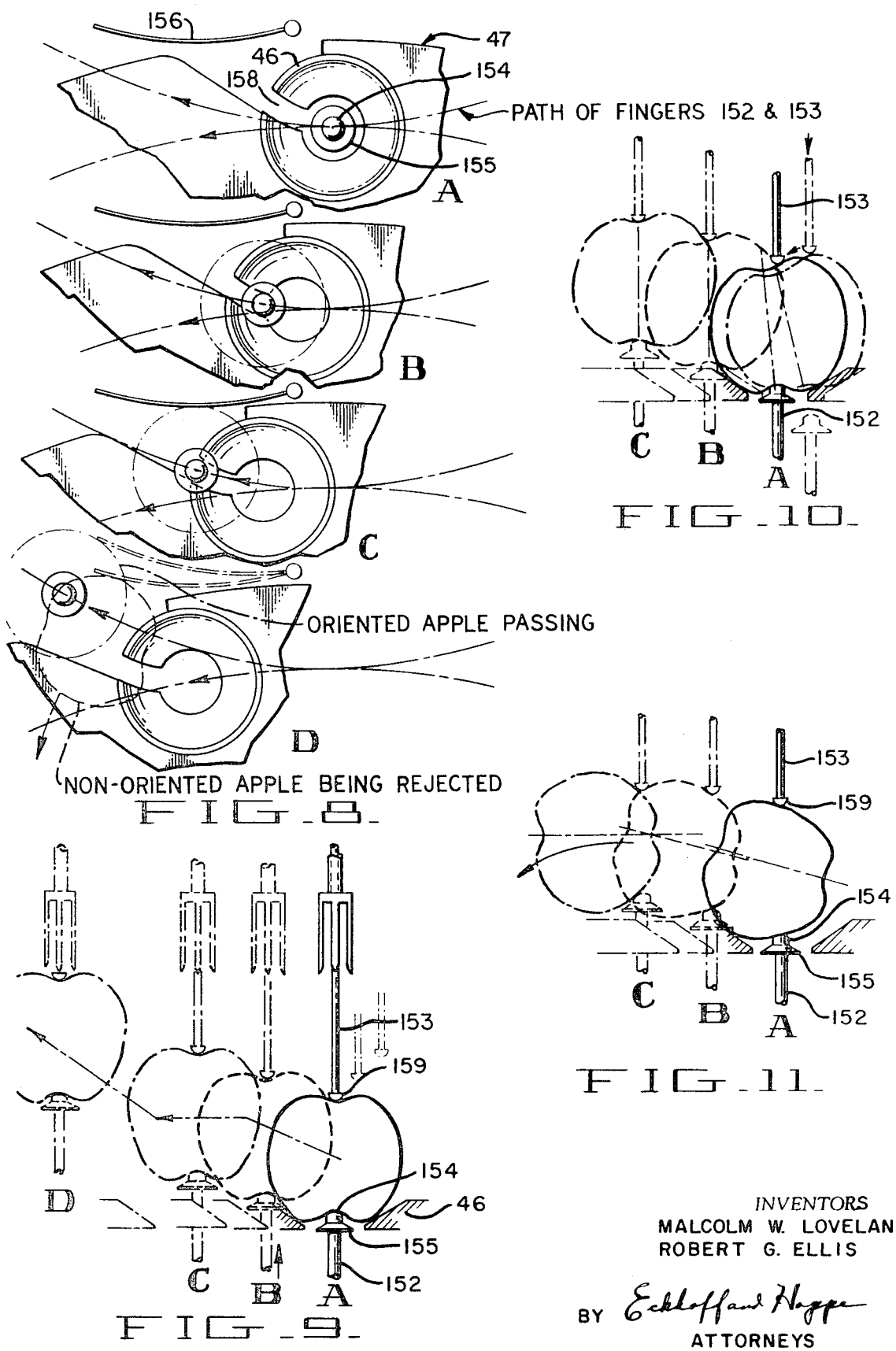

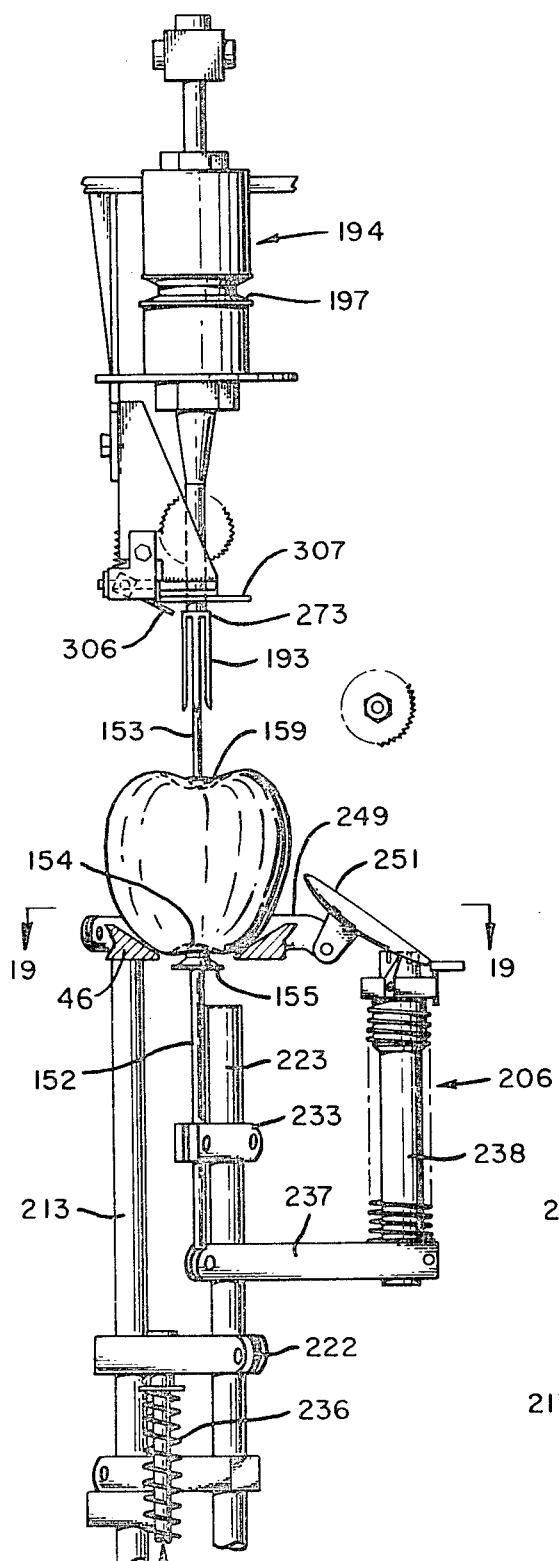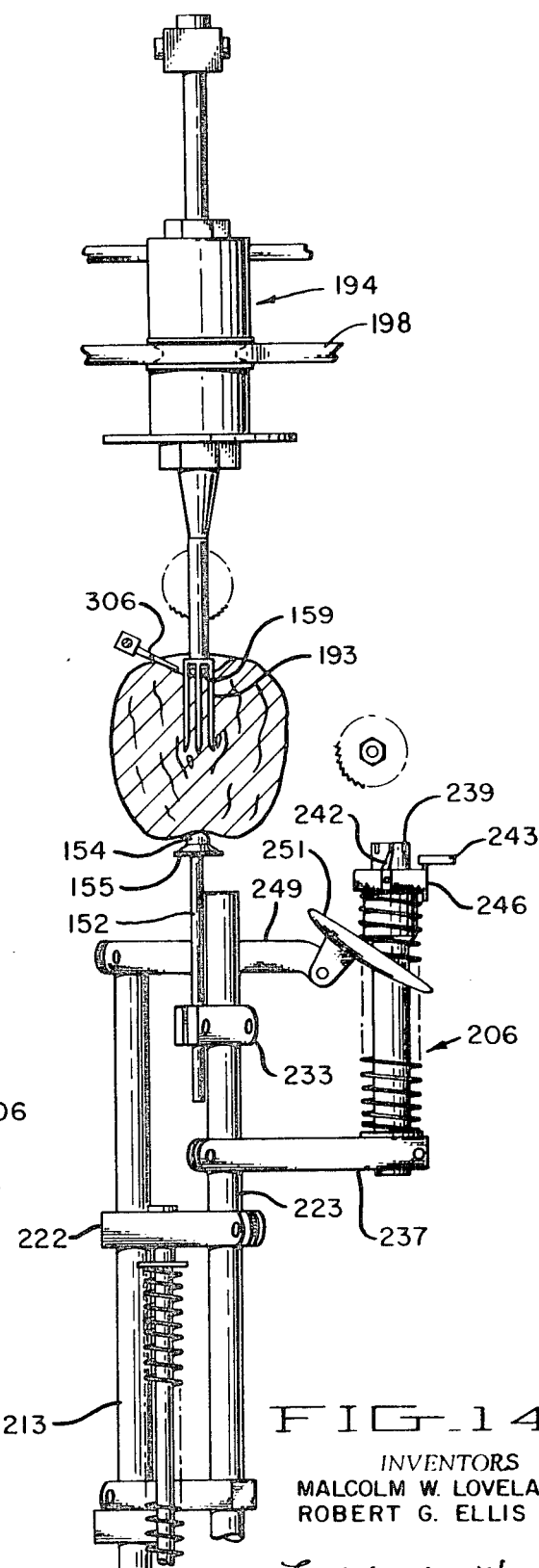

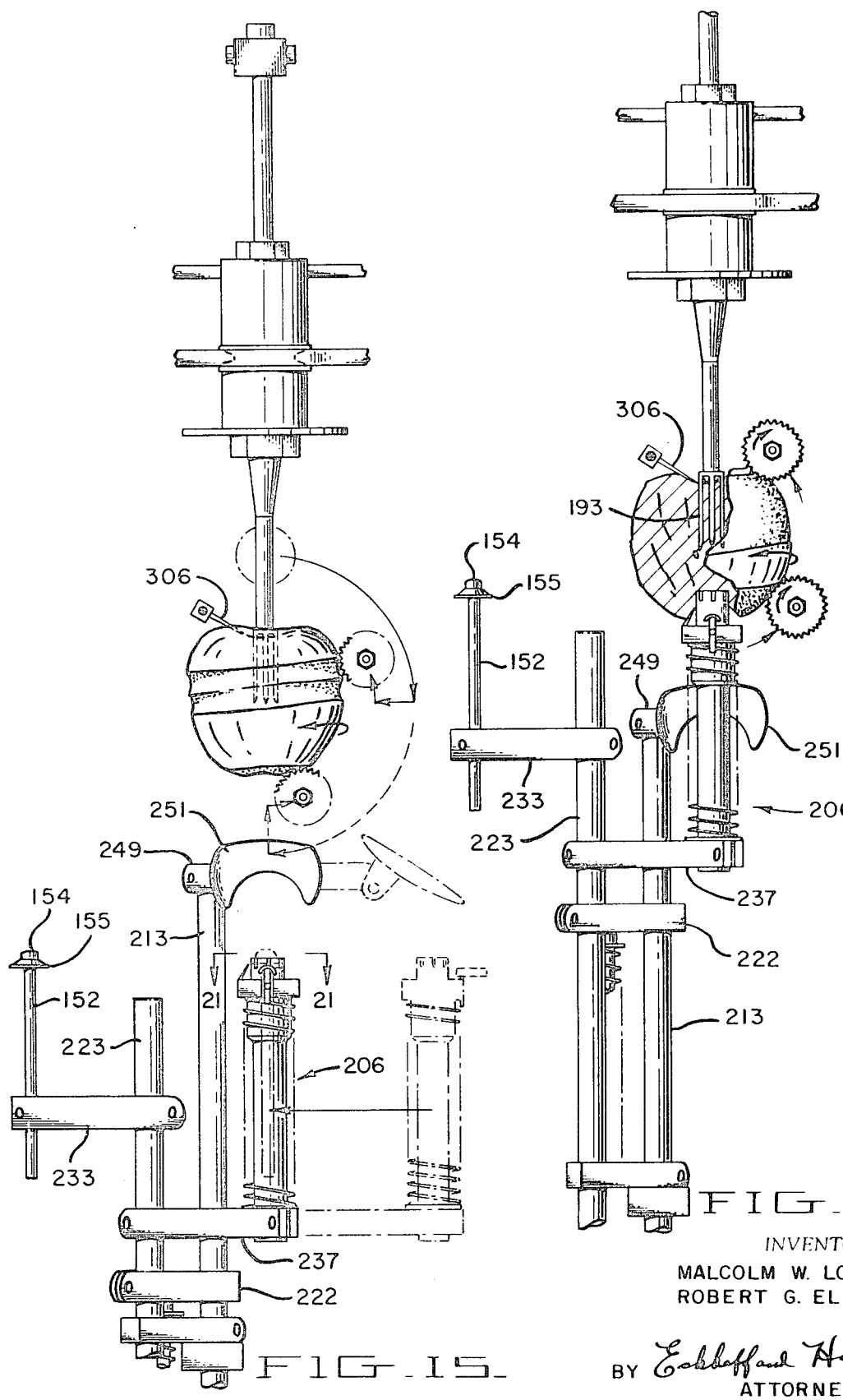

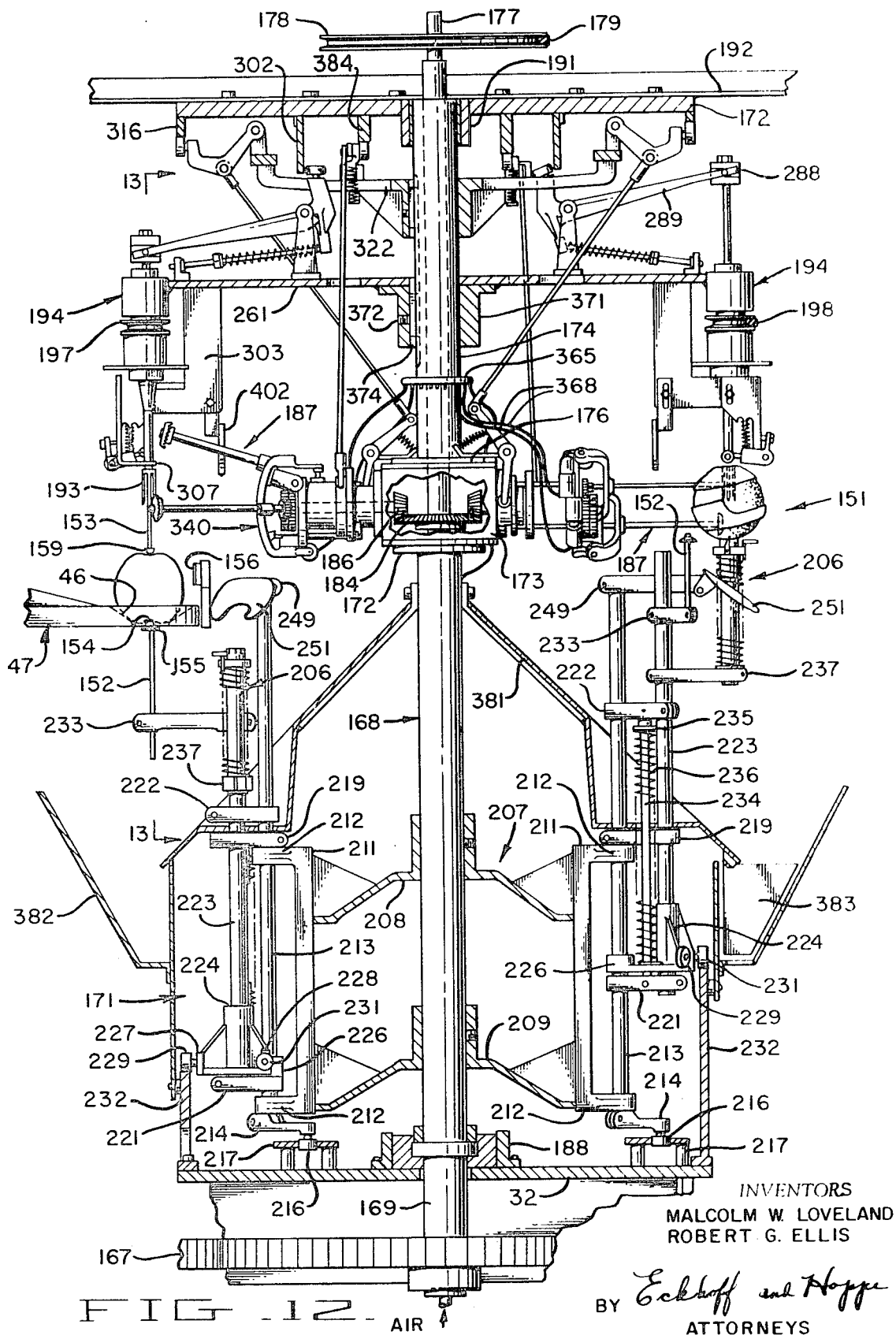

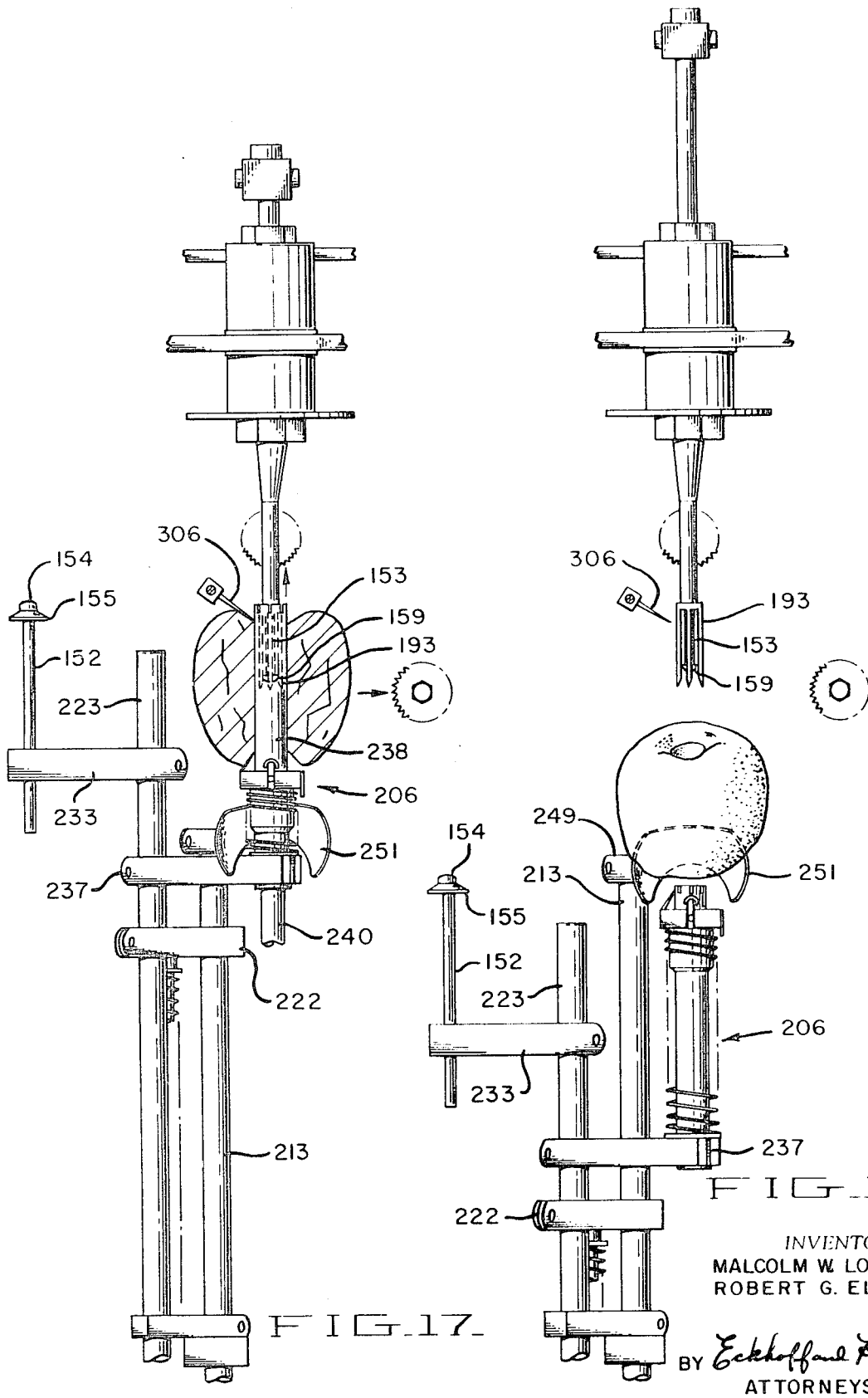

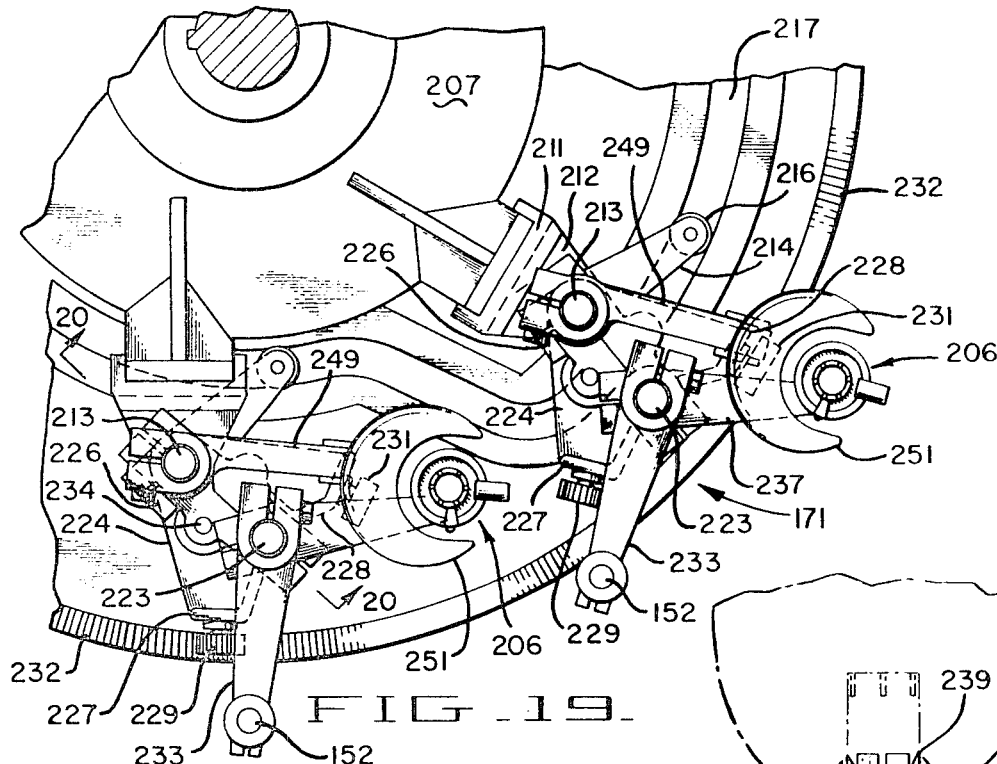
FIG. 19.
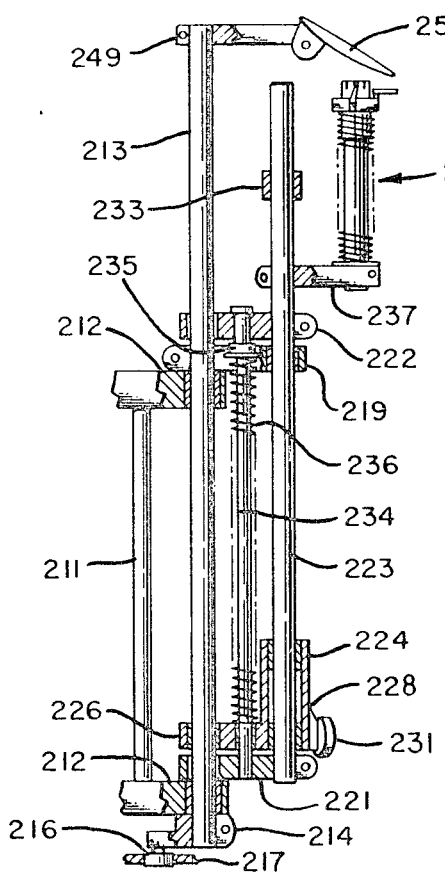
FIG. 20.
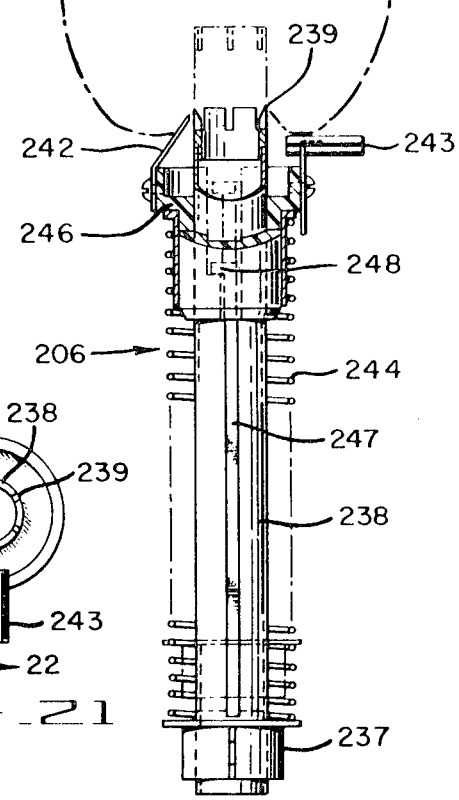
FIG. 21.
FIG. 22.
INVENTORS
MALCOLM W. LOVELAND
ROBERT G. ELLIS
BY *Eckhoff and Hoppe*
ATTORNEYS

INVENTORS
MALCOLM W. LOVELAND
ROBERT G. ELLIS

FIG_26.

INVENTORS
MALCOLM W. LOVELAND
ROBERT G. ELLIS

BY Eckhoff and Hoppe
ATTORNEYS

INVENTORS
MALCOLM W. LOVELAND
ROBERT G. ELLIS

BY Eckhoff and Hoppe
ATTORNEYS

MACHINE FOR AUTOMATICALLY PEELING AND CORING APPLES FED FROM A BULK SUPPLY

The present application is a division of U.S. Pat. application Ser. No. 629,600, filed Apr. 10, 1967, now abandoned.

FIELD OF THE INVENTION

Fruit preparation machinery operating to provide cored and peeled apples continuously from a bulk supply wherein the apples are positioned at random.

DESCRIPTION OF THE PRIOR ART

Apples have heretofore been generally fed by hand into peeling machines having a form of conical cup which engaged the outer surface of the apple and so located the apple without regard for the centering of the stem blossom axis except for the upper visible indent. Thereafter the apple in the cup was impaled on a spindle. The spindle was then rotated to pass successive portions of the apple past a dead or still knife to peel the apple. The core was removed during the peeling by a tubular knife passed axially through the apple. In some cases, the apples were mechanically fed and oriented prior to peeling but the orienting was by reference to only the outside surface and one indent rather than by reference to both indents.

SUMMARY

The apple peelers used heretofore have been largely hand fed and dependence was placed on the operator to position the apple in a feeding receptacle with its stem blossom axis aligned as best it could be so as to feed into the machine. In these machines, an apple has been generally supported by its outside surface in the feed receptacle. One of the primary requisites in the operation is the complete removal of the stem and blossom cavities to hold hand trimming to a minimum. Since many of the apples used for canning are so imperfectly shaped as to be unsuitable for the fresh fruit market, the stem blossom axis is frequently eccentrically positioned in relation to the outside surface. Locating the apple for feeding by the outside surface therefore in many instances results in its imperfect alignment so far as the subsequent coring operation is concerned. Also, in many instances in the machines used heretofore, the blossom end was not completely removed by the machine. If this was not observed during the inspection and thereafter removed by hand trimming, the blossom end found its way into the final product where it presented an unsightly appearance. If the peelers used heretofore were mechanically fed by an orientor, the same problems persisted because the apple location in the peeler was taken from the outside surface and at best only one indent was located.

It is an object of this invention to provide a continuous machine which impales the apple for peeling and coring while it is held by the stem and blossom indents so that the impaling is on their common axis.

Another object of the present invention is to provide a machine which operates continuously and is fully automatic, that is, it feeds, orients, peels and cores without the assistance of an operator.

Another object is to provide a machine wherein the stem blossom axis orientation of the fruit is accomplished in two steps. The primary orientation is by reference to the outside and one indent, and the second, wherein the orientation is perfected, is wholly by both indents and independently of the outside surface.

Another object of the present invention is to provide a machine which will reject improperly oriented apples before any peeling operation has commenced.

Another object of the present invention is to provide a machine which will peel with a minimum of waste.

Another object of the present invention is to provide a machine in which the pressure under which the peeling cutter is held against the fruit can be adjusted while the machine is operating.

Another object of the present invention is to provide a machine which peels with one or more rotary cutters to minimize the torque which must be transmitted through the apple during peeling and so enables softer fruit to be handled successfully.

Another object of the present invention is to provide a machine in which the core removed is of a minimum diameter because of the reduced torque which must be transmitted through the fruit.

Another object is to provide a machine which operates continuously with a throughput speed greatly in excess of the speeds possible with present hand fed machines.

A BRIEF DESCRIPTION OF THE DRAWINGS

In the drawings accompanying and forming a part hereof:

FIG. 1 is a side elevation showing a portion of the feeding mechanism and the primary orienting, peeling and coring mechanisms;

FIG. 2 is a schematic view showing the flow of apples through the machine from the bulk supply to the peeled and cored fruit;

FIG. 3 is a section taken along the lines 3—3 of FIG. 1 showing the feeding mechanism, a plan view of the primary orienting mechanism, and a portion of the peeling mechanism;

FIG. 4 is a plan view of a portion of the primary orienting mechanism with some parts thereof broken away for purposes of illustration;

FIG. 5 is a section taken along the lines 5—5 of FIG. 4;

FIG. 6 is a section taken along the lines 6—6 of FIG. 4;

FIG. 7 is a section taken along the lines 7—7 of FIG. 4;

Figure 23:
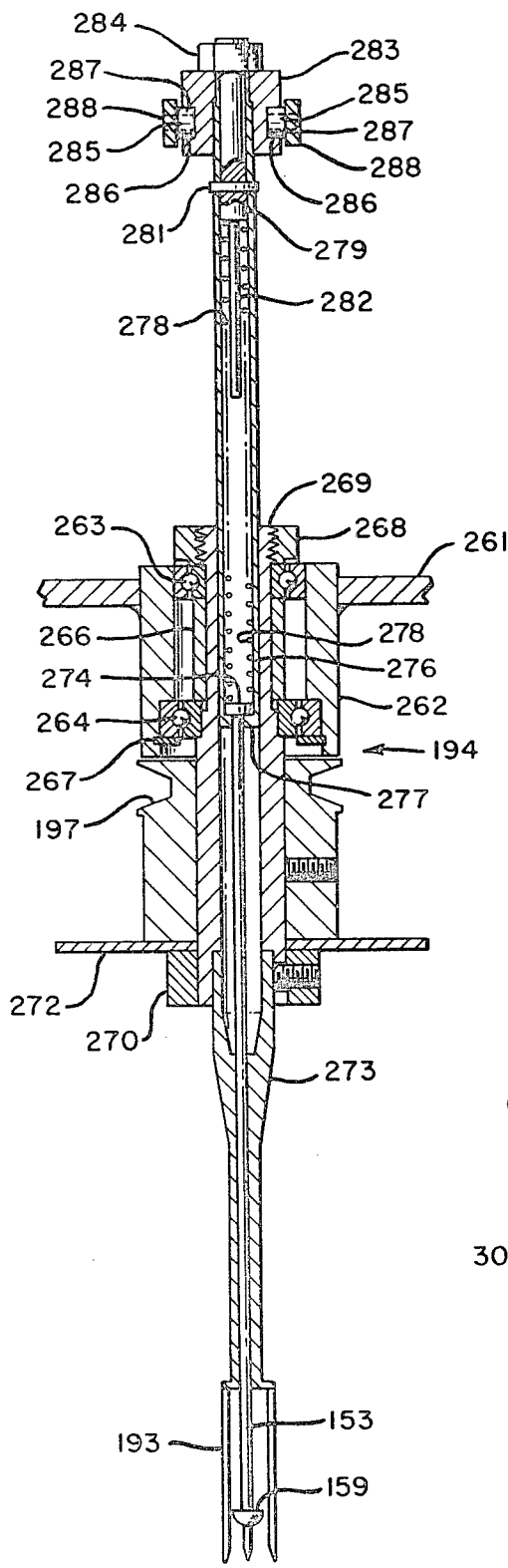
Figure 24:
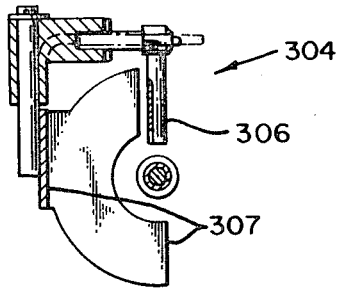
Figure 25:
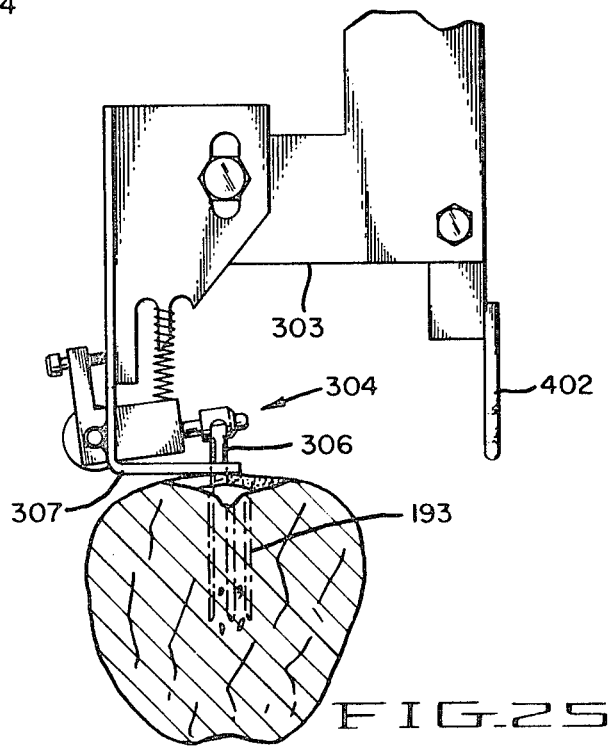
Figure 26:
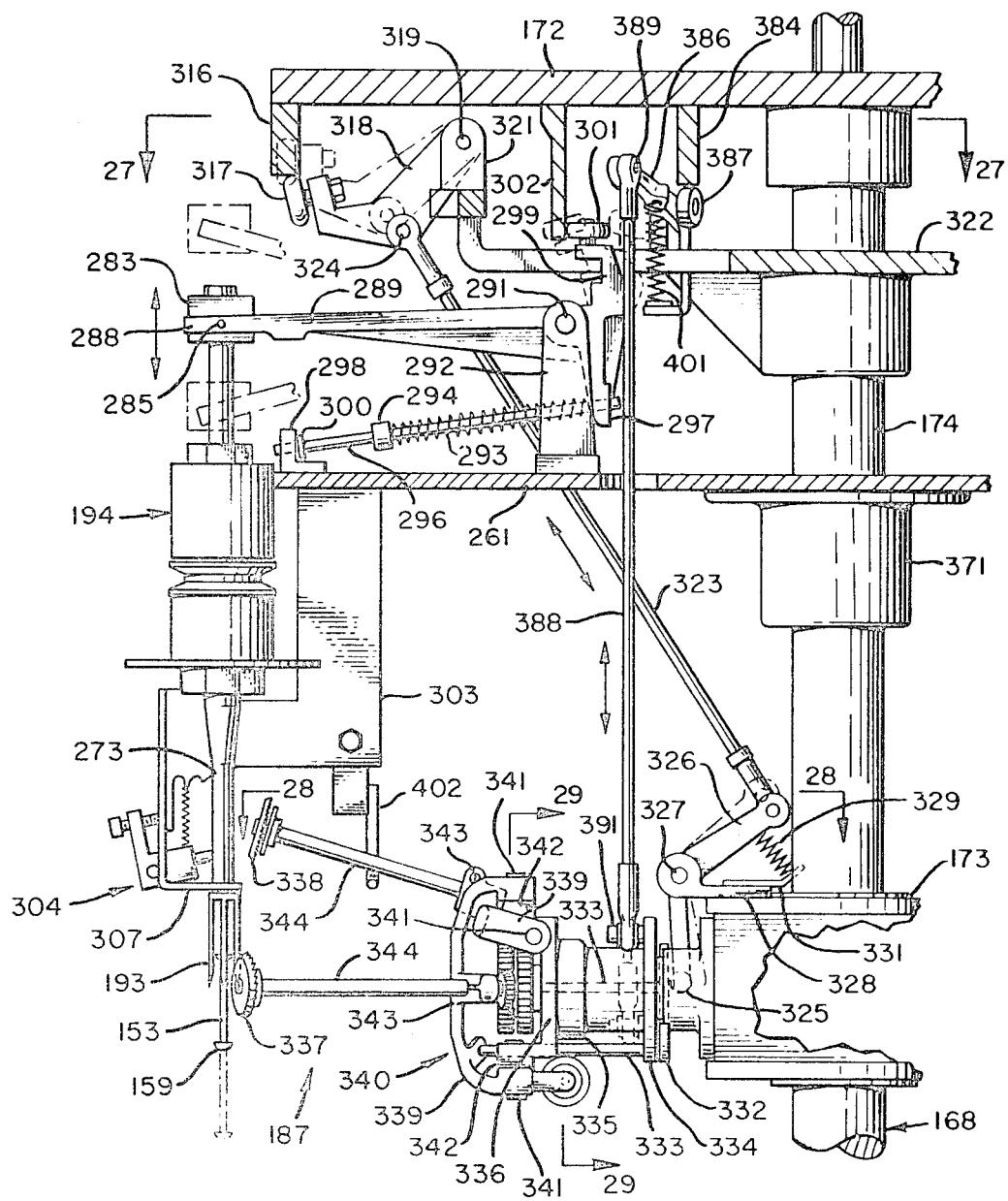
Figure 27:
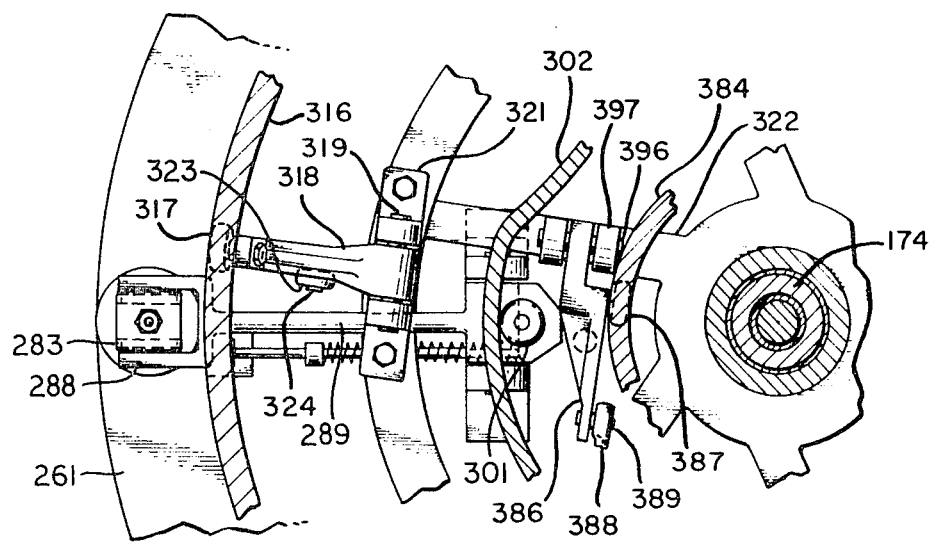
Figure 28:
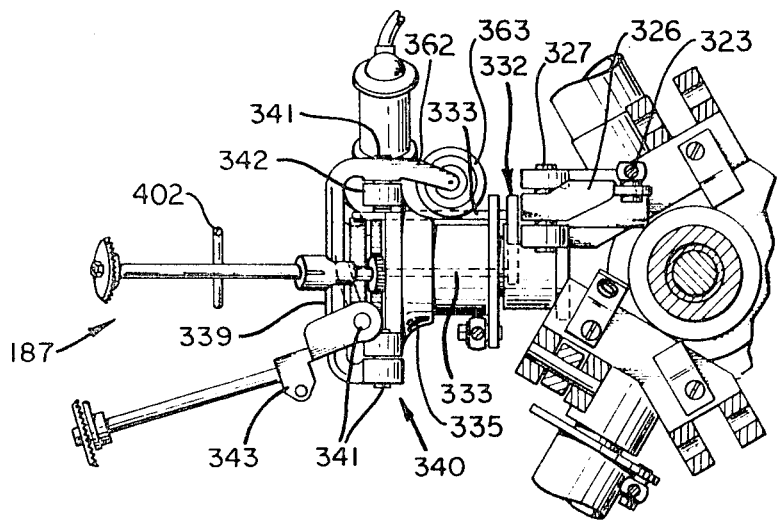
Figure 29:
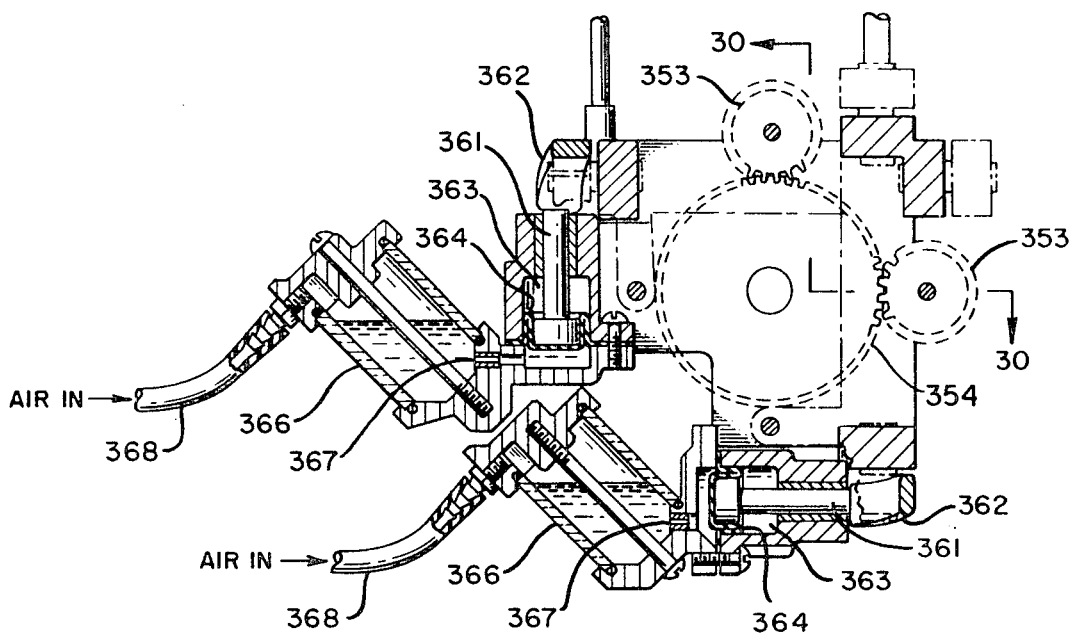
Figure 30:
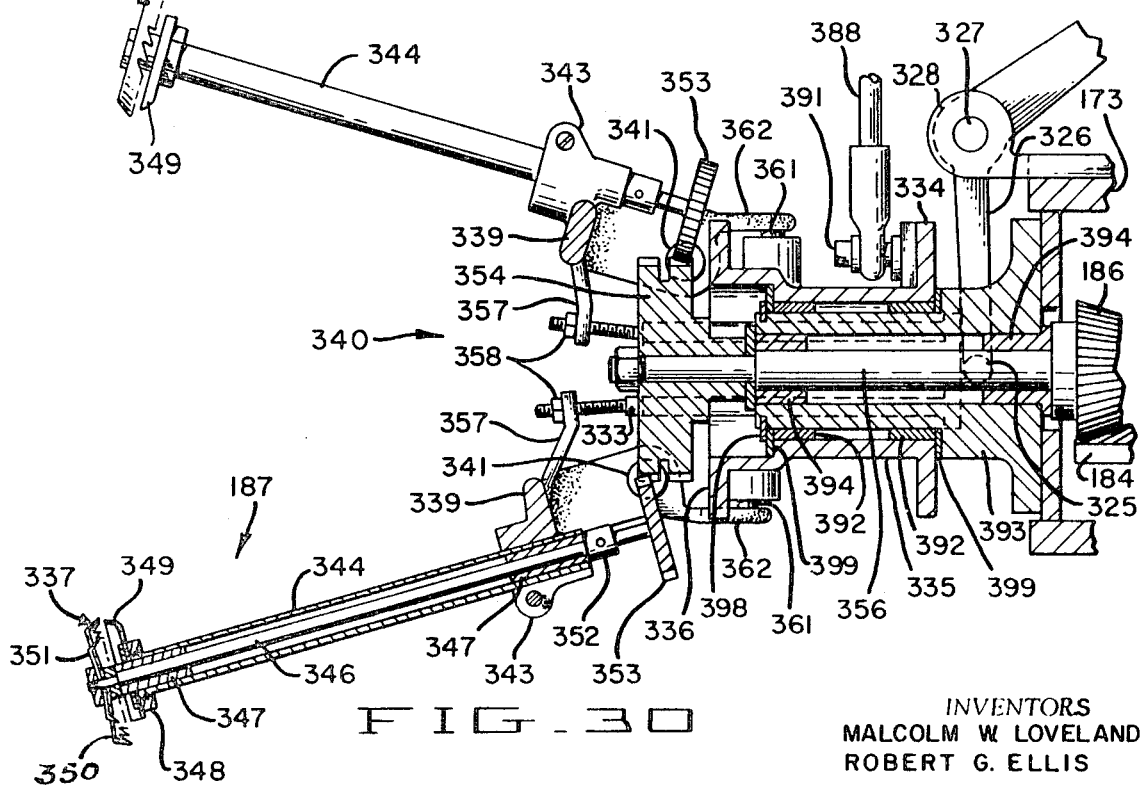

FIG. 8 is a diagrammatic view illustrating the movement of the conveyor on which the primary orientation is effected in relation to the movement of the lower stem indent engaging means, the successive views A, B, C and D illustrating the relationship of the fruit support cup and lower indent pickup finger, the movement of the latter as the fruit is carried away from the primary orienting conveyor and the action of the reject mechanism on an unoriented apple which has been lifted by the lower indent finger;

FIG. 9 shows in side elevation the successive positions of the indent pickup fingers in relation to a fruit aligned on the primary orienting conveyor with the stem and blossom axis in a vertical position, the views corresponding to positions A, B, C and D in FIG. 8;

FIG. 10 is a schematic view, like FIGS. 8 and 9, illustrating the engagement of the lower stem indent finger with fruit which is semioriented and how the upper indent finger succeeds in sliding into engagement with the upper indent so the fruit is fully aligned and held with its indents engaged;

FIG. 11 shows schematically the operation of the indent pickup fingers with cross oriented fruit and the manner of rejection because the pickup fingers slip off the surface prior to any peeling operation;

FIG. 12 is a section taken along the lines 12—12 of FIG. 3, being particularly a vertical section taken through the peeling and coring mechanism with the peeling mechanism on the left-hand side of the figure, shown in a position in which it is not in engagement with the fruit, while on the right-hand side the peeling mechanism is in peeling engagement with the fruit;

FIG. 13 is a section taken along the lines 13—13 of FIG. 12 and in which the indent pickup fingers are engaged with the fruit;

FIG. 14 is a view similar to FIG. 13 but in which the fork for turning the fruit has been engaged by the fruit while the fruit is held by the indent pickup fingers, as shown in FIG. 13;

FIG. 15 is an elevation showing the peeling mechanism in relation to the fruit during initial peeling stage of the fruit;

FIG. 16 is an elevation similar to FIG. 15 but at an advanced stage during peeling and an initial stage of coring;

FIG. 17 is a view similar to FIGS. 15 and 16 but showing the peeling mechanism moved out of engagement with the fruit and with the apple fully cored by the coring mechanism;

FIG. 18 is another view illustrating the termination of the coring operation just at the beginning of ejection of the cored and peeled fruit;

FIG. 19 is a plan view showing the mechanism operating the lower indent pickup finger and the coring device with the view taken along line 19—19 of FIG. 13;

FIG. 20 is a section taken along the lines 20—20 of FIG. 19;

FIG. 21 is a section taken along the lines 21—21 of FIG. 15;

FIG. 22 is a section taken along the lines 22—22 of FIG. 21;

FIG. 23 is a side elevation view of the mechanism for supporting and operating the upper indent pickup finger and the fork on which the fruit is impaled for peeling;

FIG. 24 is a plan view of the knife used for trimming the upper indent of the fruit;

FIG. 25 is a side elevation of the mechanism for trimming the upper indent of the fruit;

FIG. 26 is a side elevation showing the mechanism for operating the rotary cutters and for moving these into and out of fruit engagement;

FIG. 27 is a section taken along the lines 27—27 of FIG. 26;

FIG. 28 is a section taken along the lines 28—28 of FIG. 26 showing further details of the means for moving the rotary knives into and out of fruit engagement;

FIG. 29 is a section taken along the lines 29—29 of FIG. 26;

FIG. 30 is a section taken along the lines 30—30 of FIG. 29; and

Figure 31:
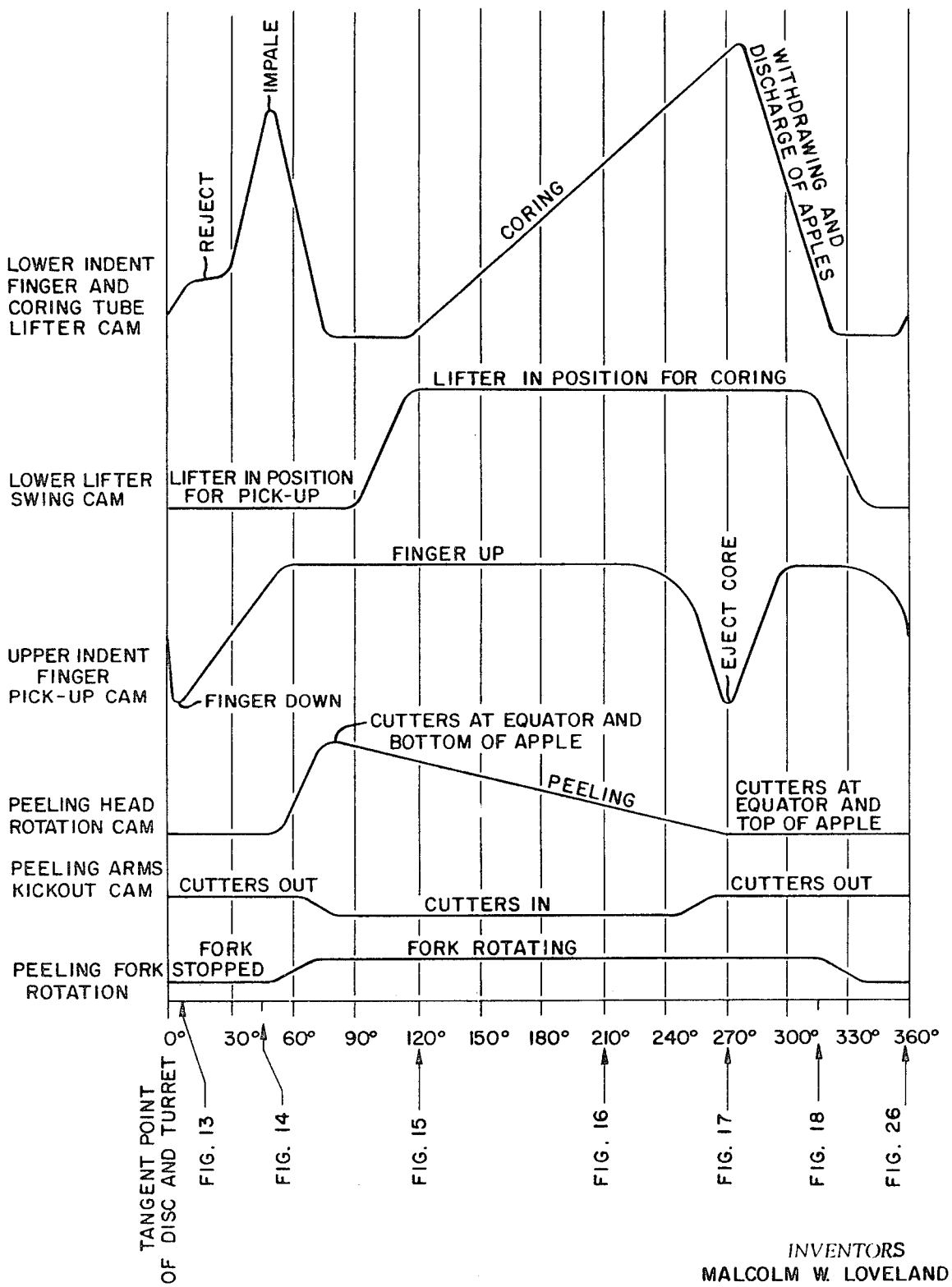

FIG. 31 is a timing chart showing the relative timing of the various operations of the machine.

DESCRIPTION OF THE PREFERRED EMBODIMENTS

GENERAL DESCRIPTION OF THE UNITS INVOLVED

The machine of the present invention includes a feed conveyor 10 (FIGS. 1, 2 and 3) which delivers apples in single file and one at a time to a feed star 42. The feed conveyor 10 includes a chain 20 movable about a path defined by several sprockets including a drive sprocket 8 mounted on shaft 11. The chain has a plurality of spaced lugs 36 thereon which pick up and roll or push the apples along a shelf 25 to discharge into feed star 42. Apples can be fed to the conveyor 10 as from bulk supply bin 21 (FIG. 3) including a belt 23 and deflectors 24 and 26.

Such a feed is described in the copending application of Ellis, et al., Ser. No. 615,000, now Pat. No. 3,414,110, filed Feb. 9, 1967.

The feed star 42 discharges the apples one at a time onto a conveyor shown here as disc 47 wherein each apple is given a primary orientation in one of the receptacles 46 in the disc. Apples are confined to the feed star by rim 43 extending about the feed base plate 44.

THE DRIVE FOR THE FEED AND ORIENTATION

The several units so far described are driven in a positive and timed relationship from a prime mover, as will be presently described. All units described and to be described are supported by a frame generally indicated as 6 (FIG. 1).

The conveyor 10, the feed star 42 and the disc 47 move in a timed relationship such that as each receptacle 46 comes beneath a pocket of the feed star an apple is dropped into a receptacle. This drive is effected by a prime mover 101 having a pulley 102 about which a belt 103 extends (FIG. 3). The belt also extends about pulley 104 on a gear box 106 from which a vertical shaft 107 depends. A pinion gear 108 on shaft 107 drives bull gear 109 (FIGS. 3 and 6) which is mounted on shaft 41 which is journaled in bearings 40 on frame members 32 and 33. Members 32 and 33 are portions of the generally indicated frame 6. Shaft 107 also has a sprocket 111 attached to it and a chain 112 passes about that sprocket to a sprocket 113 on shaft 114. Feed star 42 is mounted on shaft 114 which also carries a bevel gear 116 which in turn drives another bevel gear 117 on shaft 11 to drive the conveyor 10.

THE PRIMARY ORIENTATION MECHANISM

Means are provided for suitably rotating a primary fruit orientor, generally designated at 50, in each one of the receptacles 46 (FIGS. 4–7). The primary orientor includes a wheel 51 mounted upon one end of a shaft 52. Preferably the wheel is mounted eccentrically on the shaft and its periphery is preferably knurled as at 53 (see patent 3,198,312). Shaft 52 is journaled in a bearing support 54, collars 56 and 57 being provided at opposite ends of the shaft to retain the shaft in position with each wheel 51 centered under a receptacle. The bearing support 54 terminates in a Y-shaped yoke 58 (FIG. 4) having arms 61 and 62 journaled by pins 64 on ears 63 on the underside of the disc 47. Arm 61 has an upwardly extending extension 65 and a spring 66 is extended between this extension and a stud 67 provided upon the underside of the disc so the spring normally maintains the wheel in the position in which it rotates within the confines of the receptacle as in FIGS. 5 and 6.

The yoke arms 61 and 62 are joined together to provide a common depending arm 70. The arm 70 carries a roller 81 which rolls along a cam track 82 supported from the frame member 33 to move the yoke 58 and wheel 51 as will appear.

During the operation, it is desirable to move the wheel from the confines of its associated receptacle so that a certain secondary orienting and pickup mechanism can operate. This is effected by providing a cam track 82 radially about the center of shaft 41 and in such a location in relation to the shaft that the wheel and its support structure are moved from the position shown in FIG. 6 to the position shown in FIG. 7 in which the wheel is away from the receptacle over a small portion of the rotation of disc 47, e.g., about 15°–20° measured on each side of and from the tangent point of the orientor disc 47 and presently to be described turret 151. Thus the overall extent of the cam is 30°–40°. With some apples having an elongated shape, efficient primary orientation cannot be easily attained. In this case, the start of the cam is provided at a point about 90°–120° in advance of the tangent point so that the apples can be visually observed and hand turned into position if necessary.

Rotation of the wheel in a clockwise direction, as viewed looking to the left in FIG. 4 and shown in FIG. 5, is effected through a flexible cable 86 attached as at 87 to the shaft 52 and attached as at 88 to shaft 89 which extends through the bearings 91 mounted in turn in the sleeve 90. At one end the shaft 89 is held in a fixed position longitudinally by collar 92 while at the other end it carries a bevel gear 93 which is enmeshed with the bevel gear 131. The bevel gear 131 is secured to the reducer output shaft 127 and is driven by a drive which includes a motor 122 having a pulley 123 thereon. A belt 124 passes about this pulley and about a pulley 125 provided about a speed reducer 126 attached to disc 47 (FIGS. 1 and 6).

The sleeve 90 for each orientor 50 is secured in ring 118 bolted to the orientor disc 47 and plate 121 which is secured on the upper end of the shaft 41. Thus, the orientors 50 and the orientor disc 47 rotate with shaft 41 while the orientor wheels 51 are rotated by the drive through bevel gears 131 and 93.

In one machine disc 47 was 38 inches in diameter at the line of center of the receptacles and was turned at between 5–8 r.p.m., while wheels 51 were turned at about 100 r.p.m., by the drive through bevel gears 131 and 93. The speed of rotation of the wheel 51 should be kept substantially constant and independent of the speed of rotation of the disc. The speed of rotation of the disc is coordinated with the ease with which the apples being run may be oriented and peeled. The primary stage of orientation is achieved when the apple in the receptacle has been tumbled and turned until one indent or the other encompasses the wheel 51. The proportions of the wheel and receptacle are such in relation to an indent in an apple that when the wheel is within an indent the wheel no longer attempts to turn the apple. When this condition is obtained, the apple may be described as semioriented, that is the lower indent and the outside surface of the apple are in correlated positions but position of the upper indent has been wholly disregarded up to this time. The secondary orientation, presently to be described, refines the position of the upper indent in relation to the lower indent at the expense of the position of the outside surface of the apple.

In accordance with this invention, means are provided for assuring that an unoriented apple is disturbed from its unoriented position and is subject to an orientation attempt. It happens all too frequently that an apple will come to rest in a stable but unoriented position generally forward of the wheel and out of engagement with its associated orienting wheel 51 or in a position where the wheel 51 cannot obtain sufficient purchase to turn the apple. To cause the apple to turn into the position in which it is engaged with the wheel, we provide means to disturb an unoriented apple and cause it to move into wheel engagement. These means are shown in FIG. 3 as fingers 49, 96 and 97. Fingers 49 and 97 are preferably mounted on the circular rim 48 outside the disc 47 and extend over the path of travel of the receptacle 46 in such relation that any unoriented apple is caused to move backwards and sideways into a new engagement with the rotating wheel. Finger 96 is mounted on the extension 99 on the inside of path of travel of the receptacles to disturb any apple which may profit by a disturbance in that direction. The fingers 49, 96 and 97 are lightly spring loaded toward the centers of the receptacles. The spring is strong enough to dislodge an unoriented apple yet not dislodge an oriented apple. In actual use, it was found that the presence of the fingers was sufficient to increase the primary orientation effected by the wheels from about 85 percent to over 95 percent.

THE SECONDARY ORIENTOR

Referring particularly to FIG. 4, as the disc and its associated structure moves each orientor 50 from the second to the third of last position there shown, the wheel 51 is moved out of position so that presently described secondary orienting mechanism can come into operation and move in to engage fruit. This secondary orientation mechanism is carried on a suitable carrier such as a turret, generally indicated at 151 (FIGS. 1, 3, 4 and 12). The path of the secondary orienting mechanisms as these are moved continuously by the turret is over a path which, at station A (FIGS. 8–11), coincides with and has a common tangent point with the path of travel of the centers of receptacles 46 of the orientor disc 47. The secondary orienting mechanism includes opposite lower and upper indent pickup fingers 152 and 153 carried on the turret which, as previously stated, is generally indicated at 151.

As the semioriented apple is nearly at the tangent point of disc 47 and the turret 151, the lower indent pickup finger begins to rise through the central hole of the receptacle, but does not quite touch a semioriented apple until about at the tangent point. The upper indent pickup is also moved downward into the indent of an average sized apple which is oriented, or nearly so, at the tangent point or just prior to the tangent point if the apple is larger than average. The peripheral velocity of the indent pickup fingers 152 and 153 on the turret 151 is about double the velocity of the orientor disc 47 taken at the centerline of the receptacles.

The upper indent pickup has a button 159 on its ends which assists this pickup in its function. Thus, if the upper indent pickup 153 contacts a large apple before the tangent point is reached, the button end on the indent pickup slides forward over the apple surface until it settles into the indent. This is shown in the several views in FIG. 10. If the upper indent is to the left of center, as shown in FIG. 10, the upper indent finger will traverse the top surface of the apple because of its greater velocity and will settle in the indent, thus correcting the orientation. If the indent had been inclined to the right, the upper indent pickup would have settled into it at the first contact and force the indent to center as the apple is lifted from the receptacle 46. If the upper indent is either to the front of center or to the rear of center as the indent pickup traverses the apple, the pickup has a strong tendency to be funneled into the indent if possible. The lower indent is located sufficiently well by the wheel 51 so that the lower indent pickup has no problem centering the lower indent. The upper indent pickup is light in weight to keep its inertia to a minimum so it can move rapidly and without delay. In addition, the upper pickup is lightly spring loaded so that it will seek the upper indent, yet will not punch a hole in the apple if it makes contact outside of the indent. Both indent pickups have a rounded fruit contact surface which slips over the apple surface easily.

Substantially at the tangent point, the apple is lifted free from the primary orientor receptacle by the lower indent pickup finger which continues to lift until the bottom of the apple clears the receptacle fully, the apple being held between the top and bottom indent pickup fingers. As soon as the apple is high enough to clear the receptacle, its upward rise ceases and the apple is subjected to a light side pressure by spring reject finger 156 which will dislodge an apple which is not being carried with both fingers seated in the indents and discharge the apple into chute 157 to return to the bulk supply for recycling (FIG. 3). Finger 156 is supported on frame 6 by means not shown.

The spring pressure applied by the upper indent pickup finger is just enough so that an apple engaged by both indents will not be dislodged while apples not engaged by both indents will be dislodged by spring finger 156. Thus, apples which are not fully oriented are rejected, while those which are, pass on to be peeled. The accuracy of orientation of the top indent is improved as much as one-half inch or more and the percentage of perfectly oriented apples is improved as much as 50 percent in some varieties over the semioriented condition as delivered by the disc 47. If the semioriented apples were impaled without further regard to the upper indent, several times as many apples would require hand trimming as compared to apples processed by the present invention.

It is a feature of the lower indent finger that it includes an upper substantially cylindrical end 154 with a rounded free end and from which depends a larger diameter flange 155. The end 154 is of a diameter and height to approximate the indent of an average apple with the flange engaging that annular surface portion surrounding the indent to provide sufficient area to accomplish impalement of the apple. When engagement of end 154 with an apple indent occurs at the tangent point and the apple is lifted free of the receptacle 46, the upper end of the apple is guided by the button 159 on the upper indent pickup finger 153 and the spring 278 (FIG. 23) is compressed according to the size of the apple. However, when the rounded ends 154 and 159 engage the sides and not the indents of an apple, as in view D in FIG. 8 and in FIG. 11, the apple is lifted on the smooth apple surface and so is unstably supported by both indent pickup fingers.

When an apple is unoriented, as in FIG. 11, the upper indent pickup generally makes its initial contact behind the apple center and has a strong tendency to slip off the smooth, rounded apple surface without the side pressure of the reject finger 156 and so is rejected. This occurs because of the approximate 2:1 ratio of velocity between the apple carried by disc 47 and pickup fingers of turret 151. Should the apple be picked up by other than both indents, the side pressure of reject finger 156 dislodges and rejects the apple.

After the apple has been removed from the receptacle, the wheel swings back into its FIG. 6 position under the center opening in the receptacle ready to repeat the cycle. The apple held between the indent pickup fingers 152 and 153 moves away from the tangent point of the disc 47 and turret 151, and the lower indent pickup finger stem passes through slot 158 in the receptacle from which the apple is removed (FIGS. 8, 9 and 10). Further lifting of the lower indent pickup finger, by a mechanism yet to be described, impales the fully oriented apple onto fork 193 while the apple is guided by the indents. The upper indent finger remains in contact with the apple indent under spring pressure by a mechanism yet to be described.

THE DRIVE FOR TURNING THE TURRET STRUCTURE, THE ROTARY CUTTERS AND THE IMPALED APPLES

The turret structure 151 is rotated in a timed relation to the primary orientor disc 47 and, as has been related heretofore, at about twice the peripheral speed of the disc. To accomplish this, a pair of pinion gears 166 (FIG. 3) is provided and is driven by bull gear 109 on the shaft 41 which supports the primary orientor disc 47. The driven chain of pinion gears 166 drives gear 167 which is on the composite turret shaft, generally designated as 168 (FIG. 12).

Mounted on and rotatable with the lower portion 169 of the composite shaft 168 is the means for raising and lowering the lower indent pickup finger 152 and moving this into and out of position and for raising and lowering apple coring means to be presently described, such means being generally designated as 171 (FIGS. 12–21). Lower shaft 169 is tubular and presently described air line 368 passes up through the shaft (see FIG. 12).

Mounted on flange 172 which is secured on the upper end of the lower portion 169 of the composite shaft 168 is a gearbox 173. An upper tubular shaft section 174 has a flange 176 at its lower end which is secured to gearbox 173. A shaft 177 is suitably journaled for rotation in tubular shaft 174. At its upper end shaft 177 carries a pulley 178 about which a belt 179 is trained (FIGS. 1, 3 and 12). The belt also passes about pulley 181 which is on shaft 182 of motor 183. The lower end of shaft 177 carries a bevel gear 184 in gear box 173, the former driving bevel gears 186 which drives the rotary cutters, generally indicated at 187 (FIGS. 1, 12 and 30).

The composite shaft 168 is suitably journaled for rotation, lower shaft section 169 riding in bearing 188 carried by lower frame plate 32 while upper shaft section 174 rides in bearing 191 carried on upper frame plate 192 which is suitably supported from the lower frame plate 32.

A plate 261 is mounted on upper shaft section 174 for a limited vertical movement to provide for an adjustment in elevation and is the means for supporting the spindles for rotating an apple impaled on one of the six forks 193. Each fork 193 is included in a structure arranged for rotation, generally designated as 194, and which includes a pulley 197. A belt 198 is trained about four or five of the six pulleys as they fall within the scope of the belt during rotation (FIGS. 1 and 3) and is driven by variable pitch pulley 199 mounted on shaft 201 of motor 202 (FIGS. 1 and 3).

As the turret 151 rotates on shaft 168, each of the pulleys 197 successively engage belt 198 about 45° after tangent point and are disengaged from belt 198 during the secondary orientation and pickup of the apple.

THE MEANS FOR MOVING THE LOWER INDENT PICKUP FINGERS, THE CORE KNIFE AND ASSOCIATED MECHANISMS

Mounted on the lower shaft portion 169 and as part of the means, heretofore generally designated as 171, for moving the lower pickup finger 152, coring and associated mechanism yet to be described, is a spider support structure, generally designated 207. The spider includes upper and lower plates 208 and 209 secured to the shaft 169. Secured between these plates at equally spaced intervals are six brackets 211 having spaced ears 212. A shaft 213 is rotatably mounted in the ears. One end of an arm 214 is secured on the lower end of shaft 213 with a cam follower 216 secured on the other arm end to ride in a positive action cam 217. The travel of the follower 216 in the cam 217 is effective to cause shaft 213 to oscillate through about 70° as can be seen by comparing the showing of the two positions of shaft 213 in FIG. 19.

The oscillatory movement of shaft 213 is effective to move the lower pickup finger 152 into pickup position at one extreme (see FIGS. 12–14) and, at the other extreme, to move the lower pickup out of position and to bring into position certain presently described coring mechanism, generally designated as 206 (also see FIGS. 15–22).

The coring and pickup finger mechanism is mounted slidably to shaft 213 by spaced upper and lower brackets 219 and 221 (FIGS. 12 and 20). Bracket 219 is secured to shaft 213 while bracket 221 is slidable on shaft 213. Also mounted for sliding on shaft 213 is a third bracket 222 which is secured on a vertical rod 223 which is slidable vertically along shaft 213 because of the slidable mounting of its supporting brackets 221, 219 and 222. The oscillation of shaft 213 produced by cam 217 and arm 214 with roll 216 is transmitted to shaft 223 by means of arm 219 which is clamped to shaft 213 and is slidably connected to shaft 223. At its lower end, rod 223 carries a member 224 which has the shape generally of an equilateral triangle (FIGS. 12, 19 and 20). At one corner 226 the member is slidably mounted on shaft 213 while at the other corners 227 and 228 carrying, respectively, cam followers 229 and 231 which ride along the cam track 232 to raise and lower member 224. When cam follower 229 is riding the cam track 232, the pickup 152 is centered under fork 193 to be raised and lowered. When thereafter in the cycle shaft 213 is turned through approximately 70°, the cam follower 231 rides the cam 232 and the coring knife 206 is centered under fork 193 to be raised and lowered.

To provide for variation in apple size engaged by indent pickup finger 152, the latter is mounted by arm 233 on rod 223 to raise, lower and oscillate with that rod. To permit member 224 to move upwardly to the maximum required by cam 232 and yet not move the pickup finger 152 excessively if it is engaged with a large apple, means permitting overtravel of rod 223 is provided. This means includes a rod 234 secured between bracket 222 and bracket 221 and having a spring 236 engaged with collar 235 clamped on rod 234 below the bracket 222 and with its other end riding on member 224. If the pickup finger 152 cannot move upwardly because it is engaged with a large apple fully seated on fork 193 and if further movement of member 224 is required by cam 232, the spring 236 is compressed but the apple is not damaged.

THE CORING MECHANISM

Mounted on rod 223 is the coring mechanism 206 for removing a core from the apple which includes the apple seed cell. An arm 237 is secured to rod 223 to carry a tube 238 having a serrated and sharpened end 239. When rod 223 is raised, the core tube is raised and is forced into the apple which has earlier been impaled on the rotatable fork 193 (FIGS. 16 and 17). This raising movement is effective to cut a core in the apple through the upper surface of the apple and severs the apple from the core of the apple engaged by the fork.

LOWER INDENT TRIMMING

As the core tube is raised, means for trimming the annular area about the lower indent engages the apple. This means includes knife 242 and guard 243 (see FIGS. 14 and 19–22) slidably mounted on the core tube and urged upwardly by a spring 244. The knife and guard are carried on a sleeve 246 against which the spring presses from arm 237. The sleeve is held against rotation by a key 247 on the core tube engaged with a slot in the sleeve, the upward travel of the sleeve being limited by lateral extension 248 of the key. The guard 243 engages the apple and limits the depth of cut by the knife as the apple is rotated by the fork.

REMOVAL OF THE CORED APPLE

As the core-cutting mechanism 206 is lowered from the fully raised position wherein the apple is cut free from the core, the apple clings to the tube 238 and is lowered with it. To remove the cored apple, an arm 249 is mounted on the upper end of shaft 213. The arm 249 carries an apple discharge fork 251 which, as the core tube is lowered, engages the core apple and strips it off the tube (compare FIGS. 17 and 18 with FIG. 20) so the peeled and cored apple tumbles into the discharge chute 251 (FIG. 1).

THE MEANS FOR MOVING THE UPPER PICKUP FINGER AND FOR ROTATING AN IMPALED APPLE

Keyed to the upper shaft section 174 and slidable up and down for adjustment is a circular plate 261 (FIGS. 12, 23 and 26). Mounted at equally spaced intervals about its periphery are six fork rotating means, generally designated as 194, and which means also include the upper indent finder 153. The centerline of each fork rotating means coincides with the centerline of the related lower indent pickup finger 152 and with the centerline of the coring mechanism 206 when these are in their active positions. Each fork rotating means 194 includes a housing 262 secured to plate 261 (FIG. 23). Within the housing 262 ball bearings 263 and 264 are provided, these being spaced apart by annular separator 266. The lower bearing 264 is mounted in a recess in the housing in which it is held by annular retainer 267. The upper bearing 263 is held in place by a nut 268 screwed onto a rotatable sleeve 269 mounted in the bearings 263 and 264. At its lower end sleeve 269 carries a pulley 197 about which belt 198 is trained to rotate the sleeve 269. A splash plate 272 is held on an end of the sleeve by a collar 270. Secured on the lower end of sleeve 269 is a tubular member 273 which terminates in the apple impaling fork 193.

The upper indent pickup finger 153 is slidably mounted in the tubular member 273 and sleeve 269 for movement into and out of apple engagement. Thus, the upper end of the pickup rod 153 has a head 274 thereon slidable in a sleeve 276 and, in the absence of an apple, resting in engagement with sleeve end 277. The sleeve 276 is in turn slidable within sleeve 269. A spring 278 is confined in the sleeve 276 between the head 274 and a plug 279 fixed at the upper end of the sleeve by pin 281. A rod 282 extends down from the plug. When the coring of an apple impaled on the fork 193 is completed and the core is cut free, as shown in FIG. 17, the sleeve 276 with spring 278 and pin 282 are moved downwardly by means to be presently described. The upper pickup finger button 159 is held at the top of the fork 193 by the apple and shoulder 274 is lifted free of the sleeve end 277 (FIGS. 14 and 23). The downward motion of sleeve 276 causes pin 282 to engage the head 274 of upper pickup finger 153 to push it and its button 159 downward, as shown in FIG. 17, to push the apple core some distance into the core tube 238. Core 240 from a previous apple which may have remained inside the core tube 238 is ejected into the refuse catching trough to be described presently.

At its upper end, the sleeve 276 has a rectangular member 283 secured by nut 284. The rectangular member has slots 286 along its opposite vertical sides. Slide blocks 287 are moved back and forth in these slots and the blocks are carried on pins 285 in the forked end 288 of bell crank 289 (FIG. 26). The bellcrank 289 is mounted on pin 291 in a bracket 292 secured to plate 261. A spring 293 extends between an adjustable collar 294 on rod 296 and arm 297 on the bellcrank. The spring is supported by the rod 296 which has one end passing through stop 298 on plate 261. A flange 300 on rod 296 prevents it from passing through stop 298, the other end of rod 296 passing through the arm 297. The other arm 299 of the bellcrank has a cam follower 301 thereon held in engagement by spring 293 with a cam 302 supported on page 172. The cam 302 has a deep face so that the follower 301 can ride thereover in various positions of vertical adjustment of plate 261 and the mechanisms thereon. The contour of cam 302 is such that the position of the upper indent pickup finger 153 is altered as turret 151 is rotated about its circular path and as is shown in FIG. 31.

Adjustably mounted on a bracket 303 attached to plate 261 adjacent each fork 193 is an apple stop 307 (FIGS. 24–26). Pivotally attached to the stop is an upper indent trimmer 304 which includes a knife 306 mounted to one side of apple stop 307, the knife extending down at an angle into the upper indent (FIG. 17) to trim this end of the apple. The depth of cut is adjustable to suit the apples being run. The stop 307 limits the upward travel of the apple on the fork 193 to a position wherein the upper end of the fork is seated as deeply as possible without crushing into the apple.

ADJUSTMENT OF PEELING MEANS IN RELATION TO AN APPLE

It has been mentioned heretofore that cam 302 has a deep face so that the cam follower can ride the cam in various positions of vertical adjustment of plate 261 and the mechanisms thereon. Plate 261 is slidably mounted by collar 371 keyed by key 374 on the upper shaft 174 (FIG. 12) being retained in place by setscrew 372 at a desired elevation. The vertical change in elevation of plate 261 enables the position of an apple in relation to the cutters 187 to be adjusted so that the most economical cutting is attained. What is desired during peeling is that center of the average size apples being run approximately coincides with the pivot axis of peeling heads 340. Orchard run apples can be run but best yields are obtained when settings are made for small, medium or large apples.

THE ROTARY CUTTING MEANS

The rotary cutting means, generally designated as 187, have cutters which are each movable between an inward cutting position and an outward position in which it is free of an impaled apple. (Compare the two showings of the cutting means in FIG. 12.) As the apple is impaled on the fork 193, the cutting means are in the outward position and one is at the top of the apple and the other is at the equator, as shown in the left-hand assembly 187 in FIG. 12. As soon as the apple is impaled, the cutting means rotates 90° and the cutters move to the inward position whereupon one cutter commences cutting at the lower indent and sweeps up over the rotating apple to its equator. The other cutting means commences cutting at the equator and sweeps up over the revolving apple to the upper indent. The means for providing the sweeping action will be presently described. The means for causing the cutters to be inward or outward from the apple includes a circular cam track 316 (FIG. 26) mounted on upper plate 172. A cam follower 317 is mounted on one arm of lever 318. The other arm of the lever is hinged by pin 319 on bracket 321 which is carried on a spider 322 secured on upper shaft section 174. A rod 323 is secured by pin 324 intermediate the ends of the lever 318 and extends to an arm on another bellcrank 326. This bellcrank is supported by pin 327 on bracket 328 on the gearbox 173. A spring 329 is mounted between the upper arm of the bell crank 326 and a stop 331 on the gear box to urge the cam follower against the cam 316 (FIG. 26). The other arm of the bellcrank 326 carries roller 325 which rides against a semicircular member 332 which has pins 333 at its opposite ends (FIGS. 26, 27 and 28). Each of the pins is slidable in opposite flanges 334 and 336 (FIGS. 26 and 30) to move the rotary cutters 337 and 338 between an inward cutting position and an outward fruit free position as will be described.

Each of the rotary cutters is mounted on a yoke 339 supported by pins 341 on spaced pairs of ears 342. The yokes extend in directions 90° apart from one common corner (FIG. 26). Intermediate the ends of each yoke 339 is a split receptacle 343 which is clamped about a housing 344. A shaft 346 is journaled by bearings 347 in each housing (FIG. 30). Secured by a nut 348 on an end of housing 344 is a guard 349 while on the protruding end of shaft 346 a cutter 350 is fastened. Protruding through holes in the substantially radial portion of both cutters 337 and 338 is a two-pronged knife 351 which cuts the ribbon of peeling produced by the toothed cutting edge of cutters 337 or 338 into about ½-inch long segments for easy disposal. The guard and cutter structures are more particularly disclosed in patent 3,058,502. At the other end of shaft 346, collar 352 prevents axial movement of the shaft 346 in the housing 344. Mounted on the end of each shaft 346 is a gear 353. Each gear 353 is meshed with a gear 354 which is mounted on shaft 356 carrying a bevel gear 186 meshing with bevel gear 184 in gearbox 173.

Each of the yokes 339 has an arm 357 projecting therefrom and carrying an adjusting screw and lock nut 358 positioned to be engaged by a slidable pin 333, as has been heretofore described. As pin 333 slides, it moves the cutters between an inward cutting position and an outward fruit free position.

As shown in FIG. 26, cutter 338 cuts a path offset from the central plane of the apple so that the cutter may clear the tubular member 273 when the cutter is in contact with the apple. Cutter 337 cuts in a path substantially in the central plane of the apple.

The cutters 337 and 338 are constantly urged into fruit engagement under an adjustable regulated pressure application. This pressure is applied by a piston rod 361 (FIG. 29) which engages an arm 362 provided at an end of each yoke 339. Each piston rod 361 is carried in a cylinder 363, the piston end of the piston rod being covered by a flexible diaphragm 364 which extends between it and the cylinder. Fluid pressure is applied to the side of the diaphragm opposite from the piston from a chamber 366 through an orifice 367 (see patent 3,277,941). Preferably chamber 366 is filled with a liquid such as water but the pressure application is by means of air supplied through lines 368 under an adjustable pressure from a central source. The water from chamber 366 flowing through the orifice 367 serves to dampen movement of the piston and provide a reluctance to any sudden change in position of a cutter. Air is supplied through lines which extend up through tubular shaft 169 and which exit below gearbox 173 to a distribution manifold 365 provided above the gearbox.

The initial cutter contacts with the apple to begin with cutter 337 at the lower indent and cutter 338 substantially at the equator. The apple has begun to rotate and is up to speed as pulley 197 picks up full contact with belt 198 (FIG. 3) at a position corresponding to about 75° of rotation of turret 151 beyond the tangent point of disc 47 and turret 151 (FIG. 31 bottom curve). After the cutters have made initial contact with the apple, the move in uniform increments per each apple revolution toward a position substantially 90° around the apple from the initial contact point. Thus the cutter starting at the lower indent reaches a final position at the equator while the cutter which started at the equator finishes at the upper indent. Since the speed of spindle rotation is variable by means of the adjustable pitch pulley 199, the number of increments in moving the cutter from start to finish may be adjusted as required to meet the condition of the apples being run and the end use to which they are to be put. The mechanism to produce the rotation of the cutter mechanism consists of cam 384 attached to plate 172 (FIGS. 26, 27 and 30). Lever 386 is pivoted on pin 396 carried by bracket 397 which is mounted on spider 322 which is attached to shaft 174. Lever 386 carries cam roll 387 intermediate its ends, the cam roll 387 being engaged with cam 384. Rod 388 with swivel ends is attached at one end to lever 386 by means of a pin 389 while the other end of rod 388 is attached by bolt 391 to flange 334 of the peeling head body 335. Peeling head body 335 pivots around sleeve 393 on bearings 392 and is held on sleeve 393 by snap ring 398 and suitable thrust bearings 399 (FIG. 30).

Inside sleeve 393 are bearings 394 supporting shaft 356. Sleeve 393 is flanged at the inner end and is bolted to gearbox 173. The point of attachment of the end of rod 388 to the body 335 is such that as the rod is forced downward (FIG. 26) by the action of cam 384, the entire peeling head, generally indicated as 340, is rotated clockwise as viewed from the left about a radial axis in a plane normal to shaft 174. Spring 401 resists the downward action of cam 384 and so keeps cam roll 387 in engagement and so returns the peeling heads 340 to the position shown in FIG. 26. Finger 402 (FIGS. 26 and 28) is an L-shaped rod attached to bracket 303 and is positioned so that in the absence of an apple on fork 193, the horizontal portion of finger 402 engages the housing 344 and prevents cutter 338 from engaging the upper end of fork 193 at the end of the peeling operation.

WASTE DISPOSAL

During peeling and coring, considerable waste material develops consisting of peelings and cores which are distributed over about half of the circumference of the turret 151. In order to collect and concentrate this waste, a system is provided which also protects the lower mechanisms from accumulation of such waste. Mounted on shaft 168 and on spider 208 is a conical shield 381 which serves to deflect peel and cores into the trough 382 which is fixed on the outside of the circular cam 232. The shield carries a paddle 383 (FIG. 12) which moves the waste along the trough to a discharge opening, not shown. A shield 385 is also provided (FIGS. 1 and 3) about that position of the path of turret 151 wherein the major peeling occurs. Within shield 385, water sprays, not shown, are used to assist in keeping the peeling mechanism washed free of peeling and to flush the waste into trough 382.

SUMMARY OF OPERATION

The following provides a general description of the machine and its operation without reference to specific details as are provided in the preferred embodiment.

A chain-type feeder 10 (FIGS. 1 and 3) is provided to feed apples one at a time from a bulk supply at the required rate of speed. The chain feeder discharges into a feed star 42 (FIG. 3) which feeds the apples one at a time into the receptacles 46 on the primary orientor disc and at a velocity which closely approximates the velocity of the disc 47.

Primary orienting is done in much the same manner as in patent 3,198,312 except that the movement of the disc is continuous and that means are provided for disturbing unoriented fruit. An eccentrically mounted knurled wheel 51 rotates clockwise as viewed from its outer end. This rotation causes an apple which has not been turned so that an indent is down to ride toward the leading edge of the receptacle 46. A feature of this aspect of the machine is the provision of lightly spring loaded drag fingers 49, 96 and 97 which are provided in the path of the receptacles to disturb a nonoriented apple but not disturb one with an indent down. Thus an apple riding forward on the receptacle 46 may not touch the wheel 51 or cannot turn because the apple is resting on an obstruction or flat spot on the apple. The drag fingers push the apple to one side or the other and rearwardly enabling the wheel 51 to obtain a new purchase and begin to tumble the apple again until an indent is found by the wheel. The primary orienting is complete when the lower indent encompasses the wheel and the apple rests in the receptacle. No regard has been given the upper apple indent at this point.

Just prior to the tangent point, the wheel 51 is withdrawn from the hole in the receptacle to leave a clear path for the upward movement of a lower indent pickup finger 152 of the peeling turret 151 which also rotates over a circular path. As the apple is nearly at the tangent point of the disc 47 and the peeling turret 151, the secondary orientation begins the refinement of the vertical alignment of the indents. The lower indent pickup finger begins to rise through the central hole of the receptacle, but does not quite touch an apple with its indent downward until at about the tangent point of the disc and turret. During this time, the upper indent pickup finger 153 has been moved downward toward the apple. The point of engagement of the upper indent pickup finger with the fruit depends on its size. With an average size apple, the engagement occurs at the tangent point or if the apple is a large one, then just prior to the tangent point, the timing of the upper pickup is readily adjusted to suit conditions. The peripheral velocity of the apple peeling turret is about double the velocity of the disc 47 at the receptacle centerline so the upper pickup finger scans the upper indent area of the apple in the direction of travel. The scanning action of the spring biased upper indent finger combined with the funnel shape of the indent causes the finger to seek a central position in the upper indent. The lower indent is located well enough by the wheel so that the lower indent pickup finger has no trouble finding a central position within the indent. Thus as the apple is being lifted out of the receptacle under the guidance of the indent pickup fingers, the fingers settle into the indents as fully as possible to achieve final orientation in relation to the indents without regard to the outside surface of the apple. If the apple in the receptacle does not have its lower indent on its underside, the pickup finger may slide off and release the apple to chute 157. If the apple is picked up though not oriented, the reject spring finger 156 applies side pressure to the apple as the apple moves toward the impaling point and the apple slips from between the indent pickup fingers into chute 157.

After the apple has been lifted out of the receptacle by the indent pickup fingers, the apple is lifted under light spring pressure until it is impaled on a peeling fork 193, the lower indent pickup 152 having a broad flange 155 of sufficient area to push the apple onto the fork. The apple encounters a stop 307 set approximately at the top of the fork to prevent a large apple from being excessively impaled. The mechanism lifting the lower indent pickup finger has an overtravel spring mechanism which permits the lift mechanism to continue to move after an apple engages the stop 307. During this movement, the upper indent pickup is within the prongs of the fork 193.

As soon as the apple is impaled, the lower indent pickup 152 moves down away from the apple so that the peeling operation can commence. The cutters are of the construction shown in patent 3,058,502. The dual rotary peeling cutters idle in the position shown in FIG. 26 are about 90° away from the start of peeling position up to this time. They are held clear of the largest apple by a kickout mechanism. They are then rotated into position to begin peeling and are swung inwardly toward the center of an apple of average diameter. The entire cutter mechanism is arranged to pivot about a radial axis which passes through the center of an average apple and is in the radial plane of the fork 193. Just prior to the start of the peeling cycle, one cutter is at the fork on which the apple is impaled in line with the axis of the apple, while the other cutter is at the equator of the impaled apple. When the lower indent pickup finger has dropped away, the peeling heads pivot 90° about the radial axis in bringing the cutters to their initial cutting positions, that is with one at the lower indent and the other at the equator of the apple. The kickout mechanism thereupon releases the cutters and both swing in to touch the apple which, by this time, has begun to rotate about its axis. The spindle speed is adjustable to permit the number of peeling turns to be adjusted to suit the size and end use of the apples being peeled.

The cutter which starts peeling at the lower indent is set to be on the centerline of the fork 193 when in contact with an average apple. The cutter which starts at the equator and finishes at the fork is set offcenter enough to clear the fork in its final position. Both cutters are held in against the fruit by air pressure transmitted through an intervening mass of water and through an orifice as shown in patent 3,277,941; each cutter has its own water and pressure system (see FIG. 29). As a spindle moves around with the turret, the peeling heads pivot 90° from their respective initial contact positions, each cutter having peeled one semisphere of the apple. When the final position is reached, each cutter is lifted from the apple.

As soon as the bottom cutter is out of the way, the coring begins. This is achieved by a core tube 238 sharpened on its end and which rises slowly to cut the core free just after the completion of the peeling. The core knife is mounted on the mechanism which carries the lower indent pickup finger (FIGS. 13–22). After the apple is impaled, the mechanism lowers and swings to bring the core knife under the apple instead of the lower indent finger.

Also mounted on the tubular core knife is a lower indent trimming knife holder provided by a sleeve keyed to and sliding on the core knife tube (FIGS. 21 and 22). A light spring encircling the tube holds the lower indent cutter in contact with the apple while a knife blade 242 at the top of the sleeve cuts an annular area. A limit stop shoe 243 near the knife stops the advance of this knife when the proper depth has been reached. The top indent of the apple is trimmed by another spring loaded knife mechanism 304 mounted on the apple stop (FIGS. 24 and 25).

When the apple is fully cored, the apple clings to the core cutting tube and is lowered with the tube as the tube is withdrawn. It is removed from the tube by a stripper plate 251 which strips the apple from the core knife and discharges it from the machine.

While the core knife is still encompassing the peeling fork, the core clinging within the fork is pushed into the hollow core knife from which it is free to fall or be pushed off by the core of the next apple. Both the peeling and core waste collect in a circular pan at the lower peeling turret level and is swept around and out an opening in the pan by a paddle attached to the lower peeling turret turntable.

When the core knife is fully retracted, the combination core knife and lower indent pickup mechanism swing to bring the lower indent pickup under the peeling spindle ready to begin the next secondary orientation and pickup of the fruit.

We claim:
1. A fruit-handling device comprising:
   a. a conveyor;
   b. means mounting the conveyor for movement over a path in a horizontal plane;
   c. means for continuously moving the conveyor over such path;
   d. the conveyor having a plurality of fruit-supporting receptacles spaced along the conveyor, each receptacle being provided on its bottom with a central hole;
   e. a fruit-tumbling wheel mounted adjacent the bottom of each receptacle centrally thereof and protruding into its associated hole over a portion of the path of travel of the conveyor to tumble an unoriented fruit in said receptacle toward the leading edge of the receptacle until the lower indent encompasses said wheel;
   f. a first and lower indent pickup finger;
   g. a second and upper spring biased indent pickup finger cooperatively associated and axially aligned with the first indent pickup finger;
   h. means for continuously moving each pair of the indent fingers together over a path which is tangent with the path of the center of the receptacles on the conveyor;
   i. means for moving the first indent pickup finger upwardly to engage the lower indent of the fruit;
   j. means for simultaneously moving the second indent pickup finger toward the fruit to engage the other indent to correct the centering of the upper indent;
   k. means for lifting the first indent pickup finger after the fruit is engaged by the second indent pickup finger to remove the fruit from the receptacle while the fruit is supported by its indents between the pickup fingers;
   l. and means for applying a lateral force to a fruit held between said fingers to dislodge fruit which does not have each indent engaged by a finger.

2. A device as in claim 1 wherein the second spring biased indent pickup finger is mounted within and is movable into and out of a fork on which a fruit is impaled by the first pickup finger while held between the two indent pickup fingers.

3. A device as in claim 2 wherein the first indent pickup finger is mounted on a carrier which also has mounted thereon a tube for coring a fruit impaled on said fork, and means are provided for oscillating the carrier between a first position in which the first indent pickup finger is aligned with the second pickup finger within the fork and a second position in which the core tube is aligned with said finger and fork together with means for raising the carrier in each position first to engage the indent pickup finger with the fruit and impale the fruit on the fork and then to engage the core tube with the fruit to cut a core in the fruit.

4. A device as in claim 3 wherein the second indent pickup finger is moved through the fork to eject the core.

5. A continuous machine for preparation of double indented fruit comprising:

a. a frame;
b. a first conveyor mounted in said frame for continuous rotation having means to semiorient apples and present them with the indents generally in vertical alignment and accessible;
c. a second conveyor mounted in said frame for rotation in tangential relationship with said first conveyor;
d. means for rotating the second conveyor continuously in said frame in time with said first conveyor;
e. means on the second conveyor for engaging both indents in a fruit presented by the first conveyor;
f. and means for moving the indent-engaging means to engage the double indents in a fruit and perfect the alignment of the indents while withdrawing the fruit from the first conveyor to the second conveyor.

6. A device as in claim 5 including a fruit support spindle on the second conveyor on which fruit engaged between the indent-engaging means is impaled, stop means on the fruit support spindle limiting the travel of the fruit on the spindle during fruit impalement, and means for rotating the fruit support spindle during a portion of the travel of the conveyor.

7. A device as in claim 6 including at least one rotating cutter having a cooperatively associated fixed gage, means mounting the cutter for peeling movement over fruit impaled on the spindle, and means for moving the cutter to peel the fruit on the spindle.

8. A device as in claim 7 including means for moving the cutter into and out of engagement with a fruit on the spindle.

9. A device as in claim 6 including means for cutting a core in a fruit impaled on the spindle.

10. A device as in claim 6 including means for trimming the indents of a fruit impaled on the spindle.

11. A device as in claim 9 including means for ejecting a core.

12. A device as in claim 6 including means for ejecting the fruit from the machine.